United States Patent
Osako

(10) Patent No.: US 7,391,417 B2
(45) Date of Patent: Jun. 24, 2008

(54) PROGRAM AND IMAGE PROCESSING SYSTEM FOR RENDERING POLYGONS DISTRIBUTED THROUGHOUT A GAME SPACE

(75) Inventor: Satoru Osako, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 526 days.

(21) Appl. No.: 10/921,921

(22) Filed: Aug. 20, 2004

(65) Prior Publication Data

US 2005/0248580 A1      Nov. 10, 2005

(30) Foreign Application Priority Data

May 7, 2004     (JP)     ............... 2004-139082

(51) Int. Cl.
*G06T 15/00*     (2006.01)
*G09G 5/00*     (2006.01)

(52) U.S. Cl. .................................. 345/419; 345/619
(58) Field of Classification Search ............... None
See application file for complete search history.

(56) References Cited

U.S. PATENT DOCUMENTS

| | | | | |
|---|---|---|---|---|
| 5,867,166 A * | 2/1999 | Myhrvold et al. | ............ | 345/419 |
| 5,995,108 A | 11/1999 | Isobe et al. | ................ | 345/421 |
| 6,115,054 A * | 9/2000 | Giles | ............................ | 345/522 |
| 6,593,922 B1 | 7/2003 | Shimono | ................... | 345/419 |
| 6,734,854 B1 | 5/2004 | Shimizu | .................... | 345/422 |
| 6,738,061 B2 | 5/2004 | Suzuki | ....................... | 345/422 |
| 6,744,430 B1 | 6/2004 | Shimizu | .................... | 345/410 |
| 2004/0066384 A1* | 4/2004 | Ohba | ........................ | 345/419 |
| 2005/0068313 A1 | 3/2005 | Morimitsu et al. | .......... | 345/419 |

FOREIGN PATENT DOCUMENTS

| EP | 1 154 380 | 11/2001 |
|---|---|---|
| JP | 2003-228725 | 8/2003 |

OTHER PUBLICATIONS

Stompel et al., "SLIC: Scheduled Linear Image Compositing for Parallel Volume Rendering", IEEE Symposium on Parallel and Large-Data Visualization and Graphics, Oct. 20-21, 2003, pp. 33-40.
Hirai et al., "Accelerated Composition for Parallel Volume Rendering", IEICE Transactions on Information and Systems, vol. E81, No. 1, Jan. 1998, pp. 81-87.
European Search Report for Application No. 04019567.9-2218, dated Jul. 6, 2006.

* cited by examiner

*Primary Examiner*—Ulka Chauhan
*Assistant Examiner*—Daniel F Hajnik
(74) *Attorney, Agent, or Firm*—Nixon & Vanderhye, PC

(57) ABSTRACT

An entire view volume in a virtual three-dimensional game space to be displayed on a display unit is divided into a front view volume closer to a view point and a back view volume away from the view point. In a first frame of two successive frames, polygons in the back view volume are rendered to generate a back image. In a second frame, with the back image being taken as a background, polygons in a front view volume are rendered to form an entire image. With this, in a portable game machine including a relatively small-sized three-dimensional image processing circuit, polygons more than those that can be generated in one frame by the three-dimensional image processing circuit can be displayed.

7 Claims, 17 Drawing Sheets

NEAR CLIPPING PLANE

FAR CLIPPING PLANE

NEAR CLIPPING PLANE

FAR CLIPPING PLANE

Y
X
PROJECTION
COORDINATE
SYSTEM

Y
X
PROJECTION
COORDINATE
SYSTEM

PROJECTION COORDINATE SYSTEM

PROJECTION COORDINATE SYSTEM

Y ↑ → X
PROJECTION COORDINATE SYSTEM

Y ↑ → X
PROJECTION COORDINATE SYSTEM   OPAQUE AREA   TRANSPARENT AREA

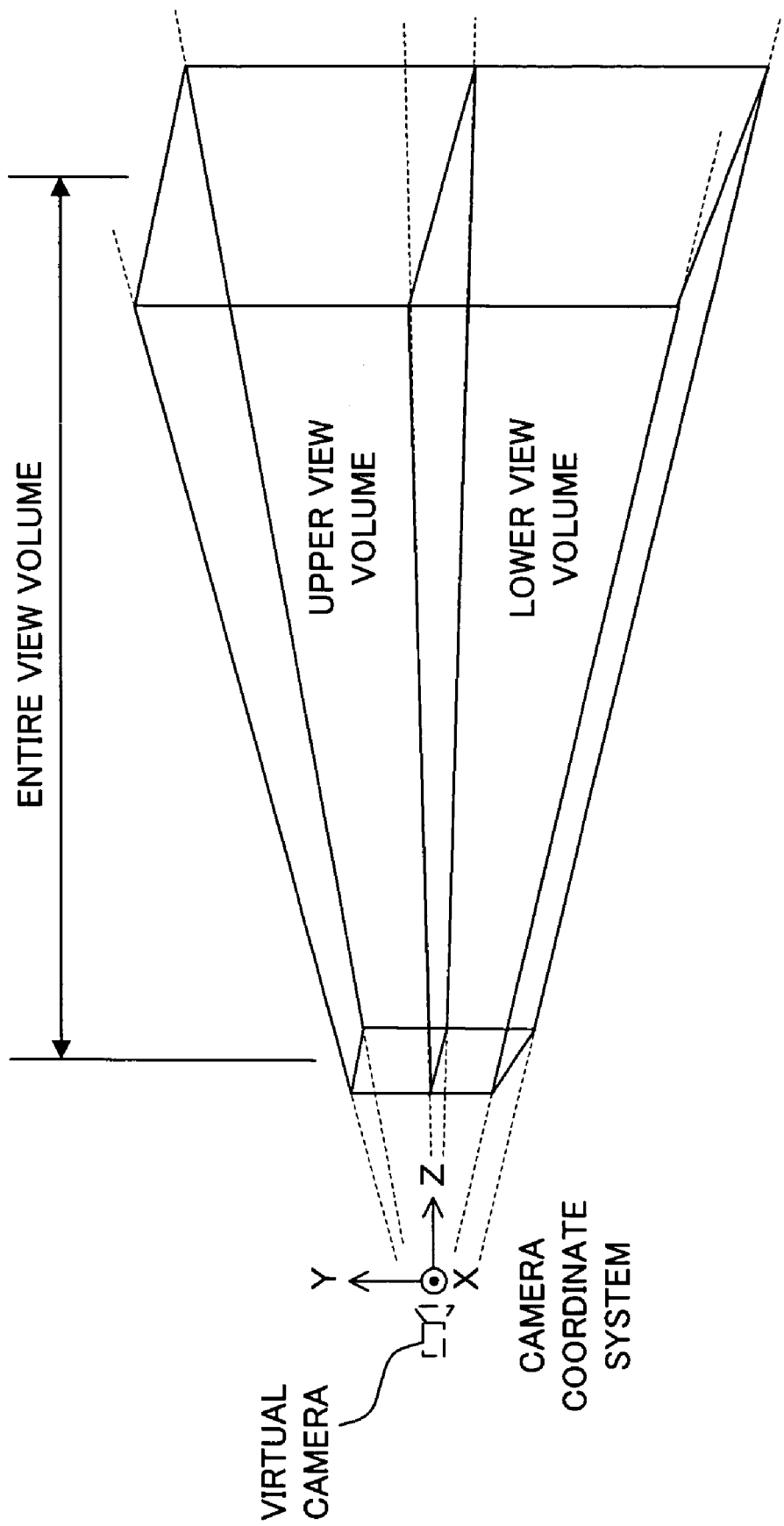

US 7,391,417 B2

PROGRAM AND IMAGE PROCESSING SYSTEM FOR RENDERING POLYGONS DISTRIBUTED THROUGHOUT A GAME SPACE

FIELD OF THE INVENTION

The illustrative embodiments relate to a portable game machine that executes a game program using a three-dimensional game image using polygons.

BACKGROUND AND SUMMARY OF THE INVENTION

Description of the Background Art

Recent computer systems include a large-sized processing circuit for calculating three-dimensional coordinates, thereby increasing the number of polygons that can be displayed in one frame.

A technology for reducing a load of a three-dimensional image processing process in one frame in order to perform another process in one frame is disclosed in Japanese Patent Laid-Open Publication No. 2003-228725 (hereinafter referred to as a patent document). In the patent document, when many polygon models similar in shape formed of a plurality of polygons have to be simultaneously displayed, as is the case of representing bushes, a polygon model having a typical shape is rendered in advance and its image is prepared, and that image is pasted on a polygon, thereby displaying each bush in a simplified manner. Thus, the number of polygons per frame is reduced, thereby increasing a frame rate.

In recent years, in the above-described computer system and a non-portable video game machine an advanced three-dimensional image processing circuit using more realistic game images with higher definition, that is, using a large number of polygons, has been adopted, to the extent that it has a large share of the market. For example, video game machines capable of processing twenty million polygons per frame have been available.

An advanced three-dimensional image processing circuit is also desirable for incorporation in portable game machines. However, with an increase in the circuit size of such an advanced three-dimensional image processing circuit, problems occur, such as an increase in the area of a semiconductor chip, an increase in the cost required for research and development of the image processing circuit, and an increase in heat, leading to a huge increase in the size of the housing of the game machine. Therefore, in the portable game machines, which are desirably provided in small sizes and at low costs, in the interest of portability and availability, such an advanced three-dimensional image processing circuit is more problematic than preferable.

As such, the portable game machines has incorporated therein a three-dimensional image processing circuit that is smaller than that in the computer system described above. In such a small-sized three-dimensional image processing circuit, however, the number of polygons processable per frame is relatively small (for example, several thousands polygons processable per frame). Therefore, what can be displayed is limited to non-realistic three-dimensional images.

Also, the technology disclosed in the above-described patent document is effective when rendering a scene in which many polygon modes similar in shape to one another are present, but is not effective in reducing the number of polygons to be processed when no polygon models similar in shape to one another are present. Moreover, in the technology disclosed in the above-described patent document, many polygon models similar in shape to one another are approximately displayed by using the image of a typical polygon model. Therefore, although the number of polygons to be processed may be reduced, scenes cannot be displayed with a high degree of fidelity.

Furthermore, as is the case of the conventional technology, increasing the frame rate through a simplified polygon process is effective when, for example, a game image including a subject moving at high speed in a game space is displayed, as in a race game. However, a liquid crystal display generally adopted to the portable game machines has a response speed slower than that of a CRT display or the like. Therefore, increasing the frame rate may not be as effective, depending on the liquid crystal display. Also, in a game in which subjects do not move much or move as rapidly as they do in a simulation, it might be desirable to display fine images with many polygons, even at the expense of the frame rate.

SUMMARY OF THE INVENTION

Therefore, an feature of an illustrative embodiment is to provide a computer-readable storage medium having stored therein a program allowing many polygons to be simultaneously displayed even when an under performing three-dimensional image processing circuit is used, and a portable game machine allowing such display.

An illustrative embodiment adopts the following structure to achieve the feature mentioned above. Note that reference characters and numerals in parentheses below merely show examples of correspondence with the embodiment described further below for the sake of better understanding of the present invention, and do not restrict the scope of the present invention.

A first aspect of an illustrative embodiment is directed to a computer-readable storage medium having stored therein a program for displaying a plurality of polygons disposed on a game space, which is a three-dimensional virtual space, based on a view point set in the game space.

This program causes a computer to perform steps including: in an N-th frame where one frame is taken as a display updating period of display means (11), a step (S35) of outputting an entire view volume image stored in an (N−1)-th frame in display-purpose storage means (27*b*) to the display means (11); a step (S30 through S32) of rendering polygons included in a first view volume, which is one of two view volumes obtained by dividing an entire view volume, which is an area in the game space to be displayed, into two to generate a first view volume image; and a step (S33) of storing the first view volume image in non-display-purpose storage means (27*a*).

This program causes the computer to further perform steps including: (b) in an (N+1)-th frame, a step (S43) of rendering polygons included in a second view volume, which is another one of the two view volumes obtained by dividing the entire view volume into two to generate a second view volume image, and combining the second view volume image and the first view volume image stored in the non-display-purpose storage means together to generate an entire view volume image; a step (S45) of outputting the generated entire view volume to the display means; and a step (S44) of storing the generated entire view volume image in the display-purpose storage means.

According to a second aspect of an illustrative embodiment based on the first aspect, the first view volume and the second view volume are aligned along a direction of a line of sight from the view point set in the game space, so that the first view volume is at a back position and the second view volume is at a front position viewed from the view point (FIG. 7). Also, in the entire view volume image generating step, the polygons in the second view volume are rendered with the first view volume image stored in non-display-purpose storage means as a background, thereby generating the entire view volume image with the second view volume image and the first view volume image combined together.

According to a third aspect of an illustrative embodiment based on the first aspect, the first view volume and the second view volume are aligned along a direction of a line of sight from the view point set in the game space (FIG. 7). Also, in the entire view volume image generating step, by using an alpha value (FIG. 19) of each pixel of at least one of the first view volume image and the second view volume image that is at a front position viewed from the view point, the first view volume image and the second view volume image are combined through alpha blending to generate the entire view volume image.

According to a fourth aspect of an illustrative embodiment based on the first aspect, the program further causes the computer to function as view volume setting means which appropriately changes a size of the first view volume and a size of the second view volume according to a disposition pattern of polygons disposed on the entire view volume.

A fifth aspect of an illustrative embodiment is directed to a computer-readable storage medium having stored therein a program for displaying a plurality of polygons disposed on a game space, which is a three-dimensional virtual space, based on a view point set in the game space.

The program causes the computer to perform steps including: in an N-th frame, where one frame is taken as a display updating period of display means, a step of outputting, for display, an entire view volume image stored in an (N−1)-th frame in display-purpose storage means; a step of rendering polygons included in a first view volume, which is one of three view volumes obtained by dividing an entire view volume, which is an area in the game space to be displayed, into three parts, to generate a first view volume image; and a step of storing the first view volume image in non-display-purpose storage means.

The program further causes the computer to perform steps including: in an (N+1)-th frame, a step of outputting the entire view volume image stored in the (N−1)-th frame in the display-purpose storage means for output; a step of rendering polygons included in a second view volume, which is another one of the three view volumes obtained by dividing the entire view volume into three parts to generate a second view volume image, and combining the second view volume image and the first view volume image stored in the non-display-purpose storage means together to generate a partial view volume image; and a step of storing the partial view volume image in the non-display-purpose storage means.

The program causes the computer to perform steps including: in an (N+2)-th frame, a step of rendering polygons included in a third view volume, which is still another one of the three view volumes obtained by dividing the entire view volume into three parts to generate a third view volume image, and combining the partial view volume image stored in the non-display-purpose storage means and the third view volume image together to generate an entire view volume image; a step of outputting the entire view volume image to the display means; and a step of storing the entire view volume image in the display-purpose storage means (FIG. 20).

A sixth aspect of an illustrative embodiment is directed to a portable game machine including: a display unit (11); a three-dimensional image processing unit (31) for generating a game image based on three-dimensional model data; a first line buffer (32) for temporarily retaining, for each line, the game image generated by the three-dimensional image processing unit and then sequentially outputting the game image to the display unit; a capture circuit (33) for capturing the image data by sequentially capturing data stored in the first line buffer; a storage unit (27) for temporarily storing the game image captured by the capture circuit; and a second line buffer (38) for temporarily retaining, for each line, the game image stored in the storage unit and then sequentially outputting the game image to the display unit.

In an N-th frame where one frame is taken as a display updating period of display means, the second line buffer outputs an entire view volume image stored in an (N−1) frame in the storage unit to the display unit (S35). The three-dimensional image processing unit renders polygons included in a first view volume, which is one of two areas obtained by dividing the entire view volume, which is an area in the game space to be displayed, into two parts to generate a first view volume image, and sequentially outputs the generated first view volume image to the first line buffer (S32). The capture circuit captures the first view volume image by sequentially capturing data stored in the first line buffer, and stores the captured first view volume image in the storage unit (S33).

In an (N+1)-th frame, the three-dimensional image processing unit renders polygons included in a second view volume, which is another one of the two areas obtained by dividing the entire view volume into two parts to generate a second view volume image, combines the second view volume image and the first view volume image stored in the storage unit together to generate an entire view volume image, and then sequentially outputs the generated entire view volume image to the first line buffer (S43). The first line buffer temporarily retains the entire view volume image generated by the three-dimensional image processing unit, and then outputs the entire view volume image to the display unit (S45). The capture circuit captures the entire view volume image by sequentially capturing data stored in the first line buffer, and stores the captured entire view volume image in the storage unit (S44).

A seventh aspect of an illustrative embodiment is directed to a portable game machine including: a display unit (11); a three-dimensional image processing unit (31) for generating a game image based on three-dimensional model data; a first line buffer (32) for temporarily retaining, for each line, the game image generated by the three-dimensional image processing unit and then sequentially outputting the game image to the display unit; a capture circuit (33) for capturing the image data by sequentially capturing data stored in the first line buffer; a storage unit (27) for temporarily storing the game image captured by the capture circuit; and a second line buffer (38) for temporarily retaining, for each line, the game image stored in the storage unit and then sequentially outputting the game image to the display unit.

In an N-th frame where one frame is taken as a display updating period of the display means, the second line buffer outputs an entire view volume image stored in an (N−1) frame in the storage unit to the display unit. The three-dimensional image processing unit renders polygons included in a first view volume, which is one of three areas obtained by dividing the entire view volume, which is an area in the game space to be displayed, into three parts to generate a first view volume image, and sequentially outputs the generated first view volume image to the first line buffer. The capture circuit captures the first view volume image by sequentially capturing data stored in the first line buffer, and stores the captured first view volume image in the storage unit.

In an (N+1)-th frame, the second line buffer outputs the entire view volume image stored in the (N−1)-th frame in the storage unit to the display unit. The three-dimensional image processing unit renders polygons included in a second view volume, which is another one of the three areas obtained by dividing the entire view volume into three parts to generate a second view volume image, combines the first view volume image stored in the storage unit and the second view volume image together to generate a partial view volume image, and then sequentially outputs the generated partial view volume image to the first line buffer. The capture circuit captures the partial view volume image by sequentially capturing data stored in the first line buffer.

In an (N+2)-th frame, the three-dimensional image processing unit renders polygons included in a third view volume, which is still another one of the three areas obtained by dividing the entire view volume into three parts to generate a third view volume image, combines the partial view volume image stored in the storage unit and the third view volume image together to generate an entire view volume image, and then sequentially outputs the generated partial view volume image to the first line buffer. The first line buffer temporarily retains the entire view volume image generated by the three-dimensional image processing unit and then sequentially outputs the entire view volume image to the display unit. The capture circuit captures the entire view volume image by sequentially capturing data stored in the first line buffer (FIG. 20).

According to the first aspect, while the first view volume image is being generated in the N-th frame, the entire image generated in the (N−1)-th frame is displayed in the display means, polygons more than those that can be generated by the three-dimensional image processing circuit can be displayed on the display means for each frame.

According to the second aspect, by using the rendering results of the view volume away from the view point as a background, the view volume closer to the view point is rendered, thereby displaying twice as many polygons as can be normally rendered by the three-dimensional image processing circuit. Also, to render the view volume closer to the view volume, a Z buffer value used for rendering the view volume away from the view volume is negligible (does not have to be used). Therefore, a calculation required for comparison with the Z buffer value can be eliminated.

According to the third aspect, the rendering results of the view volume away from the view point and the rendering results of the view volume closer to the view point are combined through alpha blending. With this, it is possible to display twice as many polygons as can be normally rendered by the three-dimensional image processing circuit.

According to the fourth aspect, the size of the first view volume and the size of the second view volume are appropriately changed according to the disposition pattern of the polygons disposed in the entire view volume. Therefore, even if the polygons are disposed in the entire view volume in an unbalanced manner, these polygons can be disposed in balance in the first view volume and the second view volume.

According to the fifth aspect, more polygons than those according to the first aspect can be displayed. Also, in the N-th frame, while the first view volume image is being generated, the entire image generated in the (N−1)-th frame is displayed on the display means. Therefore, the entire image is displayed on the display image for each frame.

According to the sixth and seventh aspects, even in portable game machines in which it is difficult to adopt a high-performance three-dimensional processing circuit, a game image with higher definition can be displayed. Particularly, with the combination of the line buffers and the capture circuit, the circuit size can be made small compared with the case where a frame buffer is used. Therefore, it is possible to provide a game machine capable of displaying a game image with high definition at low cost.

These and other objects, features, aspects and advantages of the present invention will become more apparent from the following detailed description of the present invention when taken in conjunction with the accompanying drawings.

BRIEF DESCRIPTION OF THE DRAWINGS

FIG. 21 is an illustration showing another example of the divided view volume.

DESCRIPTION OF THE PREFERRED EMBODIMENT

Hereinafter, a portable game machine 1 according to an embodiment of the present invention is described. In the present embodiment, a game machine physically including two display screens, with one of the display screens being covered with a touch panel, is exemplarily described. However, the present invention is not meant to be restricted to such a game machine. That is, the present invention can also be applied to a non-portable video game machine, an arcade game machine, a portable terminal, a cellular phone, a personal computer, or the like.

Figure 1:
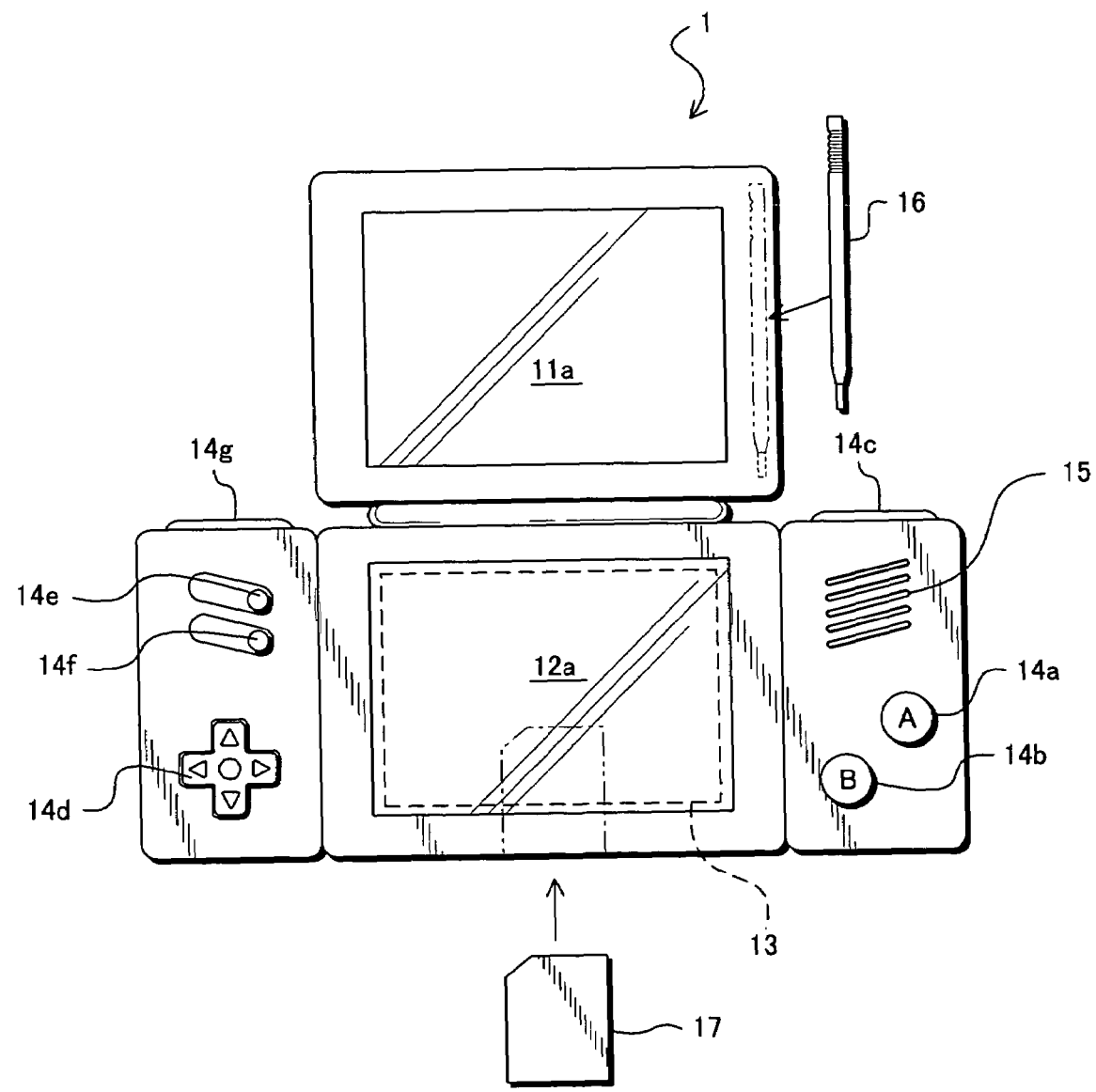
FIG. 1 is an external view of a portable game machine 1 according to one embodiment of the present invention.

FIG. 1 is an external view of the portable game machine 1. As shown in FIG. 1, the portable game machine 1 includes two display screens, that is, a first display screen 11a and a second display screen 12a. The surface of the second display screen 12a discovered with a touch panel 13. Also, the second display screen 12a is provided at right with an A button 14a, a B button 14b, and an R switch 14c, which are operable by the right hand of the player, and a loudspeaker 15 for producing game music. At left, the second display screen 12a is provided with a cross key 14d, a start button 14e, a select button 14f, and an L switch 14g, which are operable by the left hand of the player. Also, the portable game machine 1 includes a removably-accommodated stylus 16 for input to the touch panel 13. Furthermore, the portable game machine 1 has removably inserted therein a cartridge 17, which is a storage medium having stored therein a game program of the illustrative embodiments. Note that, in the present embodiment, the touch panel 13 is exemplarily provided as an input unit, but this is not meant to restrict the present invention. Furthermore, it is assumed in the present embodiment that, of these two display screens, only the first display screen 11a has displayed thereon game images.

Figure 2:
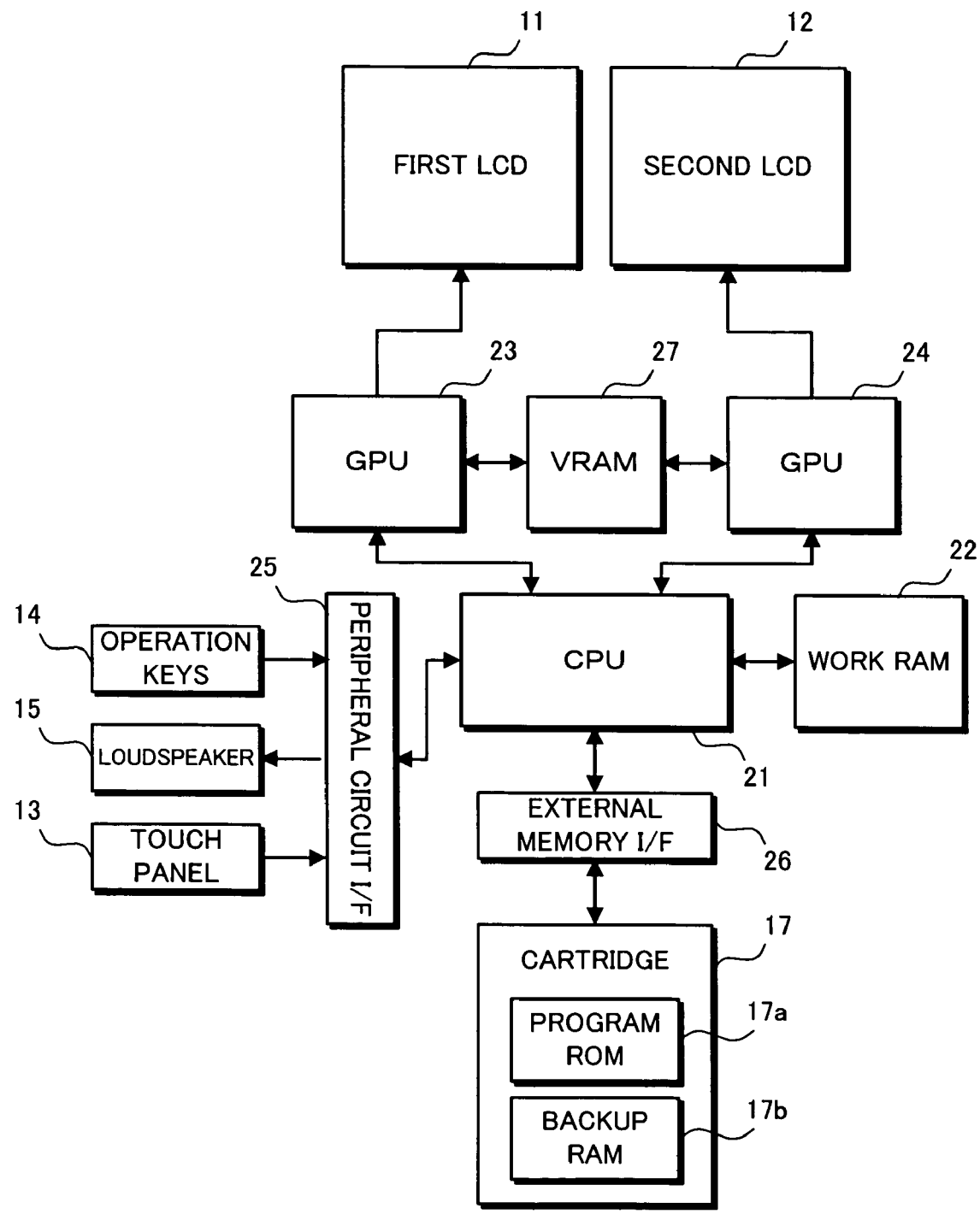
FIG. 2 is an illustration showing an internal configuration of the portable game machine 1.

FIG. 2 is a block diagram showing the portable game machine 1. As shown in FIG. 2, the portable game machine 1 includes a CPU (central processing unit) 21, which is an example of a computer for executing the game program, and other components. The CPU 21 includes a work RAM (working storage unit) 22, two GPUs (graphic processing units) 23 and 24, and a peripheral circuit I/F (interface) 25 that are electrically connected to one another. The work RAM 22 is a memory for temporarily storing, for example, the game program to be executed by the CPU 21 and calculation results of the CPU 21. The GPUs 23 and 24 each use, in response to an instruction from the CPU 21, a VRAM 27 to generate a game image for display output to a first LCD (liquid crystal display unit) 11 and a second LCD 12, and cause the generated game image to be displayed on the first display screen 11a of the first LCD 11 and the second display screen 12a of the second LCD 12. The peripheral circuit I/F 25 is a circuit for transmitting and receiving data between external input/output units, such as the touch panel 13, the operation keys 14, the loudspeaker 15, and the CPU 21. The touch panel 13 (including a device driver for the touch panel) outputs coordinate data corresponding to a position input (specified) with the stylus 16.

Furthermore, the CPU 21 is electrically connected to the external memory I/F 26, in which the cartridge 17 is inserted. The cartridge 17 is a storage medium for storing the game program and, specifically includes a program ROM 17a for storing the game program and a backup RAM 17b for rewritably storing backup data. The game program stored in the program ROM 17a of the cartridge 17 is loaded to the work RAM 22 and is then executed by the CPU 21. In the present embodiment, an exemplary case is described in which the game program is supplied from an external storage medium to the portable game machine 1. However, the game program may be stored in a non-volatile memory incorporated in advance in the portable game machine 1, or may be supplied to the portable game machine 1 via a wired or wireless communication circuit.

Figure 3:
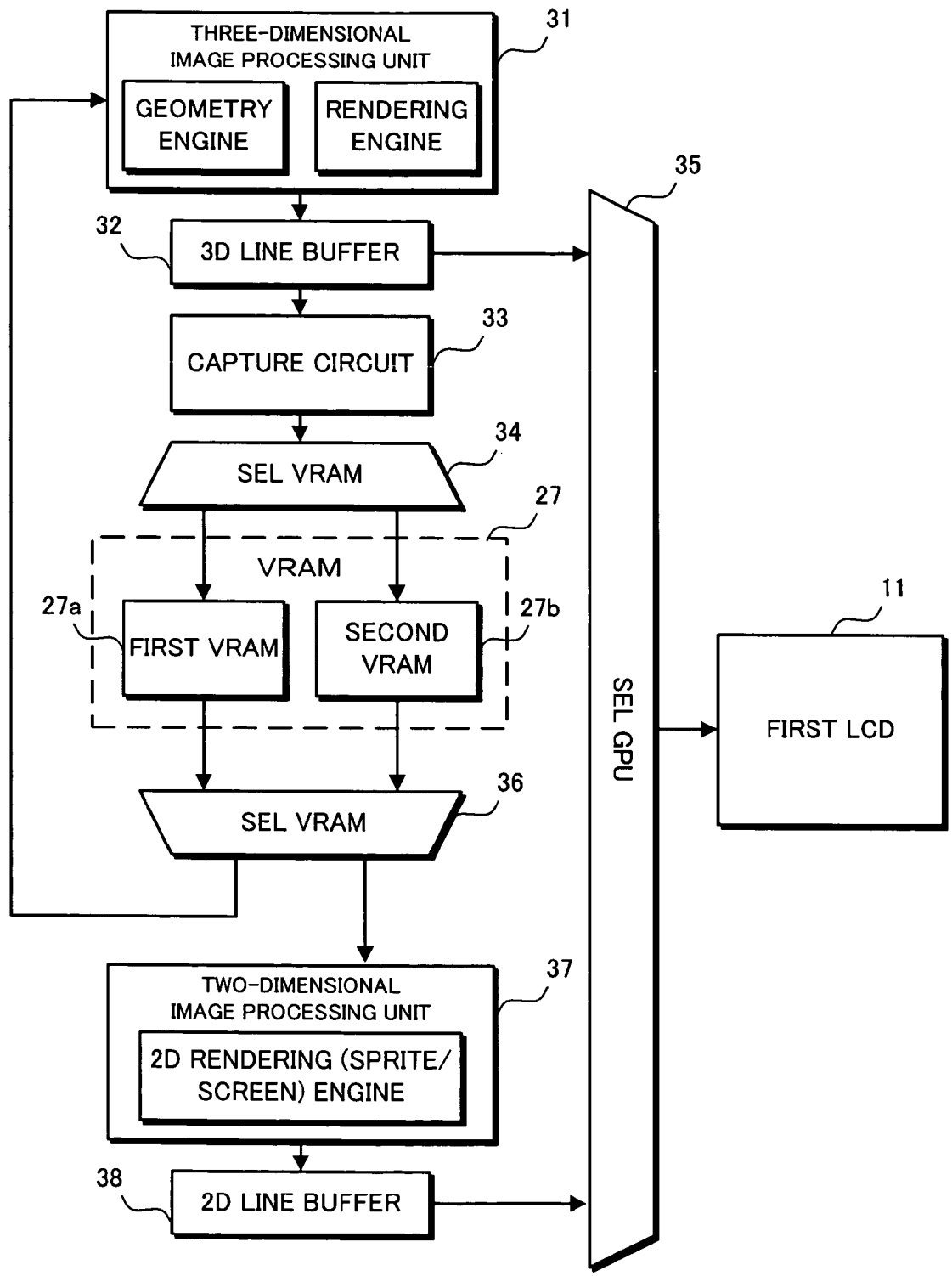
FIG. 3 is an illustration showing an internal configuration of a GPU 23.

FIG. 3 is a block diagram of the GPU 23. The GPU 23 includes two image processing units, that is, a three-dimensional image processing unit 31 and a two-dimensional image processing unit 37. The three-dimensional image processing unit 31 includes a geometry engine for calculating each vertex of a three-dimensional model based on three-dimensional model data and a rendering engine for generating a game image from the three-dimensional model disposed on a virtual three-dimensional game space. The two-dimensional image processing unit 37 includes a 2D rendering engine for generating a game image based on two-dimensional image data representing characters and two-dimensional image data representing backgrounds.

The three-dimensional image processing unit 31 is connected to the 3D line buffer 32. The 3D line buffer 32 is a buffer memory for temporarily retaining image data for one scanning line of the first LCD 11. The image data generated by the three-dimensional image processing unit 31 is stored in this 3D line buffer 32 sequentially by one line.

The 3D line buffer 32 is connected to a capture circuit 33 and a GPU selector (SEL GPU) 35. The capture circuit 33 sequentially reads image data for one line stored in the 3D line buffer 32 and then sequentially stores the read image data in the VRAM 27, thereby capturing the game image generated by the three-dimensional image processing unit 31.

The capture circuit 33 is connected to a VRAM selector (SEL VRAM) 34. The VRAM 27 is provided with two VRAMs, that is, a first VRAM 27a and a second VRAM 27b. Instead of these two first and second VRAMs 27a and 27b, a single VRAM may be used with its two different storage areas being used as the first VRAM 27a and the second VRAM 27b. The VRAM selector 34 switches an output destination of the capture circuit 33 between the first VRAM 27a and the second VRAM 27b.

The first VRAM 27a and the second VRAM 27b are connected to a VRAM selector (SEL VRAM) 36. The VRAM selector 36 switches the source of data to the two-dimensional image processing unit 37 between the first VRAM 27a and the second VRAM 27b.

The two-dimensional image processing unit 37 is connected to a 2D line buffer 38. As with the 3D line buffer 32, the 2D line buffer 38 is a buffer memory for temporarily retaining image data for one scanning line of the first LCD 11. The image data generated by the two-dimensional image processing unit 37 is stored in this 2D line buffer 38 sequentially by line.

The 2D line buffer 38 is connected to a GPU selector 35. The GPU selector 35 switches a source of data to the first LCD 11 between the 3D line buffer 32 and the 2D line buffer 38.

Hereinafter, the operation of the portable game machine 1 according to the present embodiment is described. Note that the portable game machine 1 alternately performs operations with periods of one frame. Also note that a frame indicates a display updating period of a display unit (here, the first LCD 11). Hereinafter, the operation of the portable game machine 1 is described as being divided into a process in a first frame and a process in a second frame. Note that the "first frame" and the "second frame" are named as such merely for convenience. That is, if one frame is assumed to be a first frame, frames immediately before and after that frame are second frames. Conversely, if one frame is assumed to be a second frame, frames immediately before and after that frame are first frames.

Figure 4:
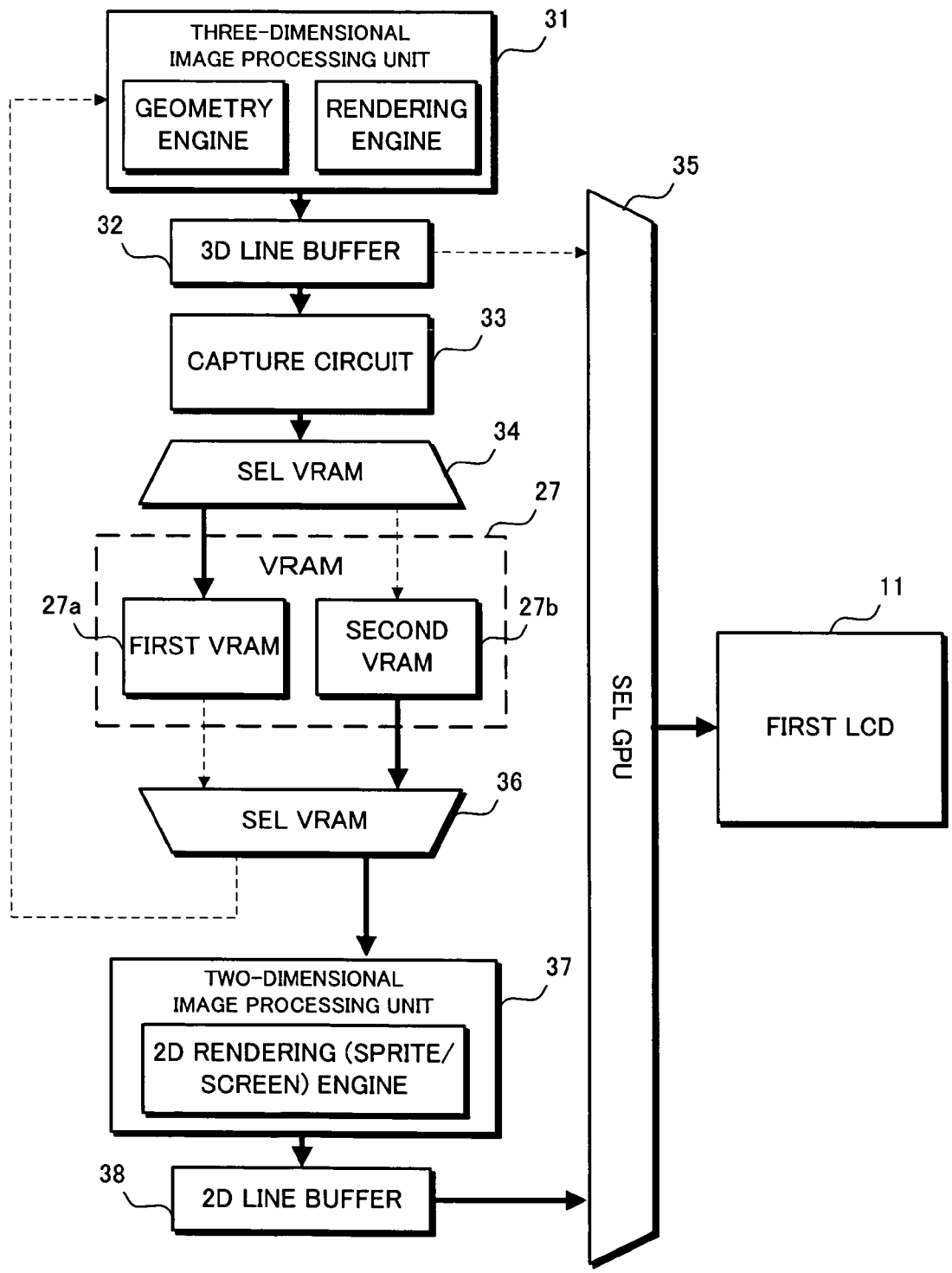
FIG. 4 is an illustration showing the operation of the portable game machine 1 in a first frame.

FIG. 4 is an illustration showing the operation of the portable game machine 1 in a first frame. As shown in FIG. 4, in the first frame, the game image generated by the three-dimensional image processing unit 31 is supplied to the 3D line buffer 32. Also, the output from the capture circuit 33 is supplied to the first VRAM 27a. That is, the game image generated in this frame by the three-dimensional image processing unit 31 is captured by the capture circuit 33, and is then stored in the first VRAM 27a. Also, the two-dimensional image processing unit 37 reads the game image stored in the second VRAM 27b (the game image captured in the immediately-preceding second frame by the capture circuit 33, as will be described further below). This game image is, as will be described further below, identical to the game image supplied in the immediately-preceding second frame to the first LCD 11. The game image read by the two-dimensional image processing unit 37 is supplied via the 2D line buffer 38 to the first LCD 11. As such, in the first frame, the game image generated in this frame by the three-dimensional image processing unit 31 is stored in the first VRAM 27a, while the game image generated in the immediately-preceding second frame by the three-dimensional image processing unit 31 is supplied to the first LCD 11.

Figure 5:
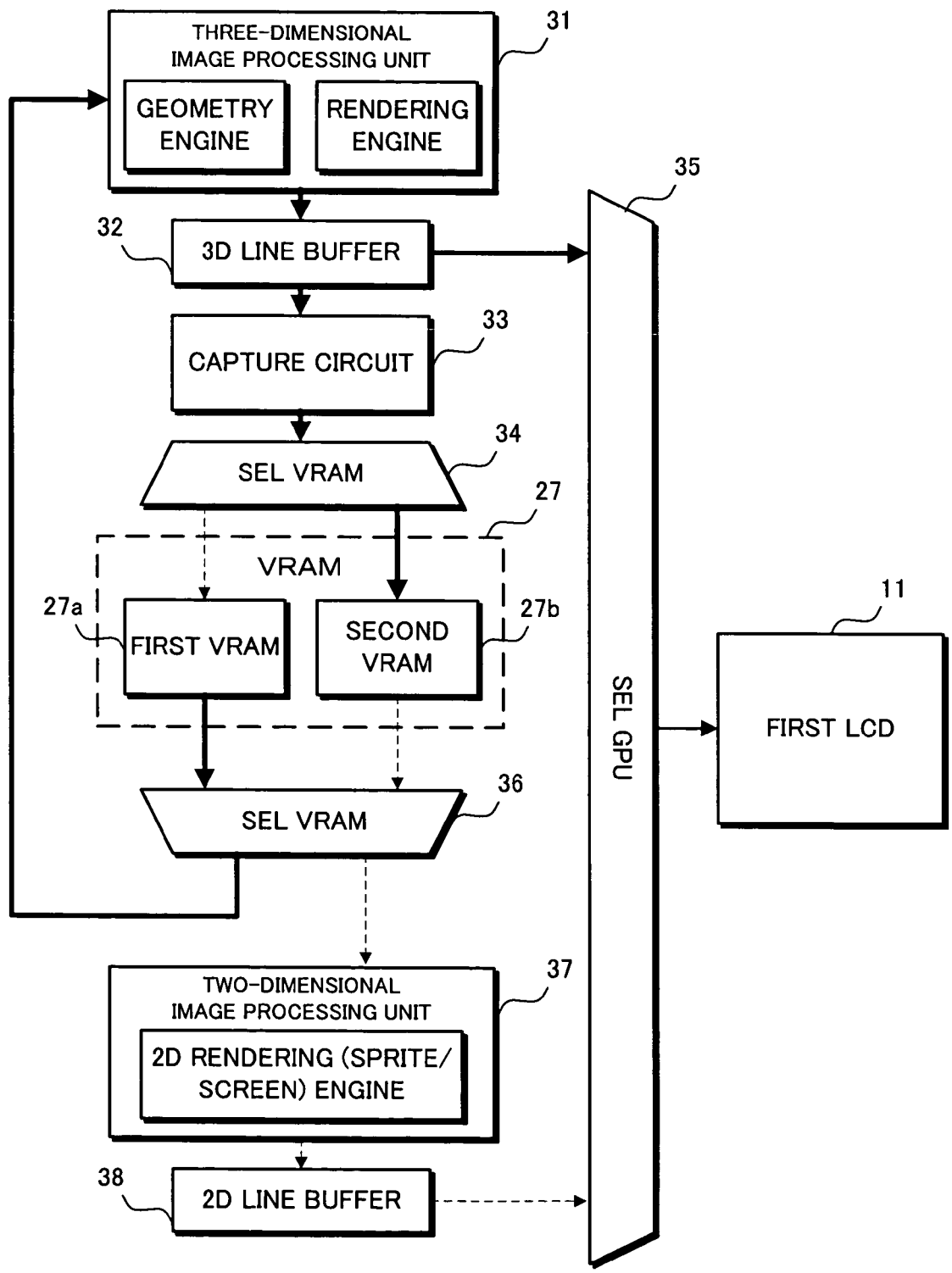
FIG. 5 is an illustration showing the operation of the portable game machine 1 in a second frame.

FIG. 5 is an illustration showing the operation of the portable game machine 1 in a second frame. As shown in FIG. 5, in the second frame, the game image stored in the first VRAM 27a (that is, the game image captured in the immediately-preceding first frame by the capture circuit 33) is supplied via the VRAM selector 36 to the three-dimensional image processing unit 31. Then, based on this game image, the three-dimensional image processing unit 31 generates a game image. The game image generated by the three-dimensional image processing unit 31 is then supplied via the 3D line buffer 32 to the first LCD 11. Also, the output from the capture circuit 33 is supplied to the second VRAM 27b. That is, the game image identical to the game image supplied in this frame to the first LCD 11 is captured by the capture circuit 33 and is then stored in the second VRAM 27b. As such, in the second frame, the game image newly generated by the three-dimensional image processing unit 31 based on the game image generated in the immediately-preceding first frame by the three-dimensional image processing unit 31 is supplied to the first LCD 11.

Figure 6:
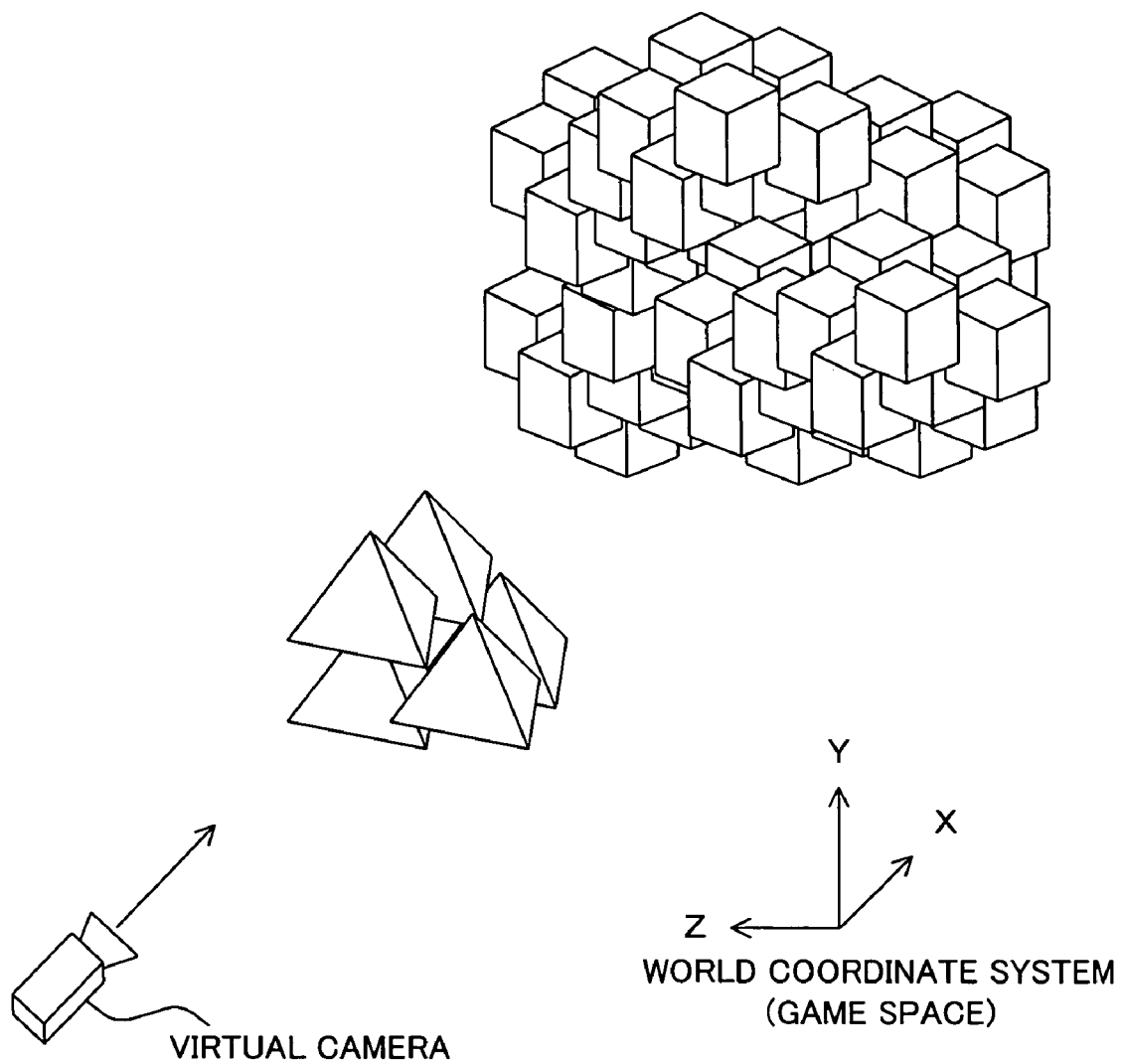
FIG. 6 is an illustration showing one example of a virtual three-dimensional game space.

In the present embodiment, game images are generated by changing the setting of a virtual camera between the first frame and the second frame. FIG. 6 is an illustration showing one example of a virtual three-dimensional game space. In FIG. 6, in this virtual three-dimensional game space, a large number of hexahedron polygon model groups, a large number of tetrahedron polygon model groups, and one virtual camera are disposed.

Hereinafter, an image processing method according to the illustrative embodiments is described in more detail.

Figure 7:
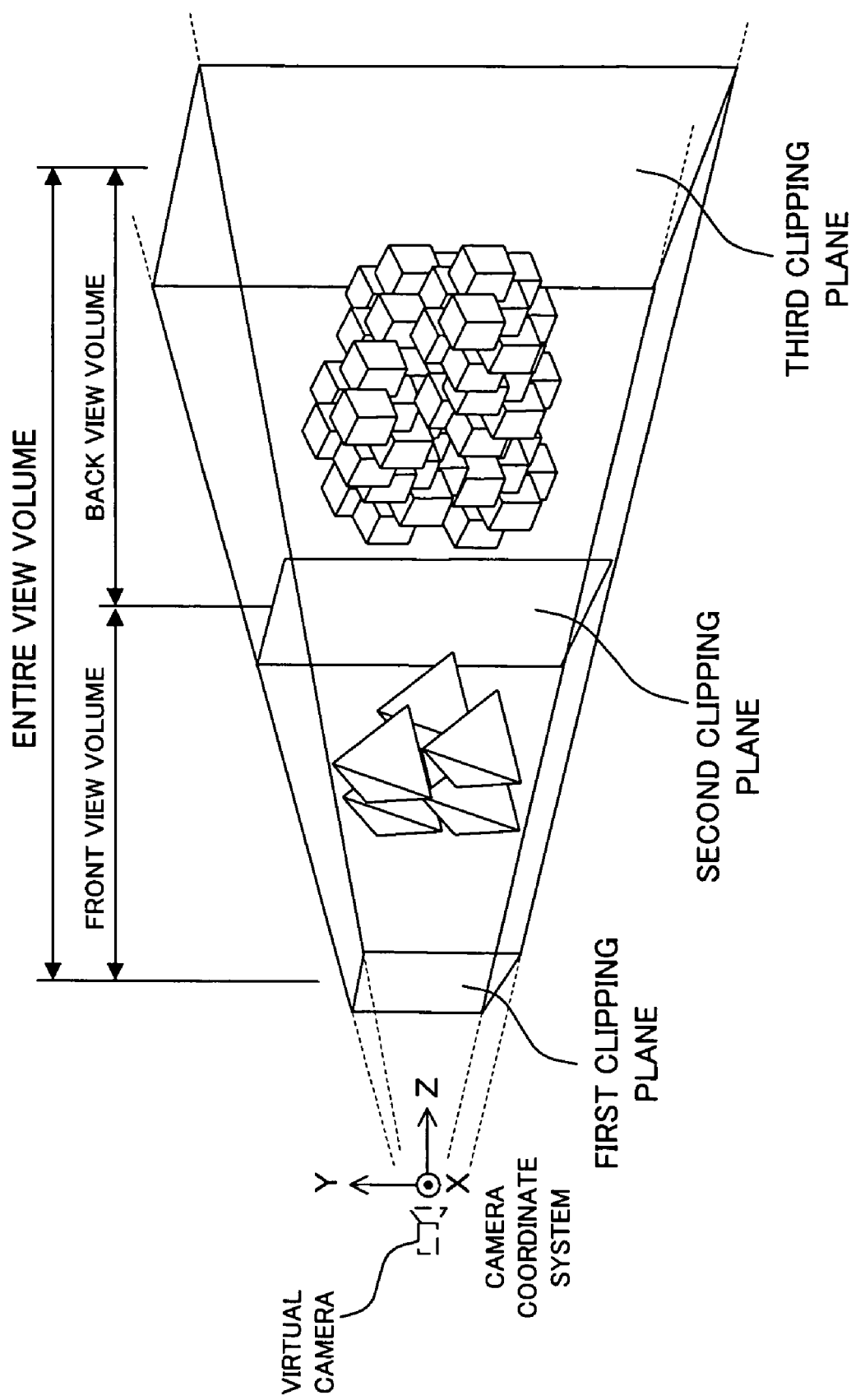
FIG. 7 is an illustration showing an example of how a view volume is divided.
Figure 8:
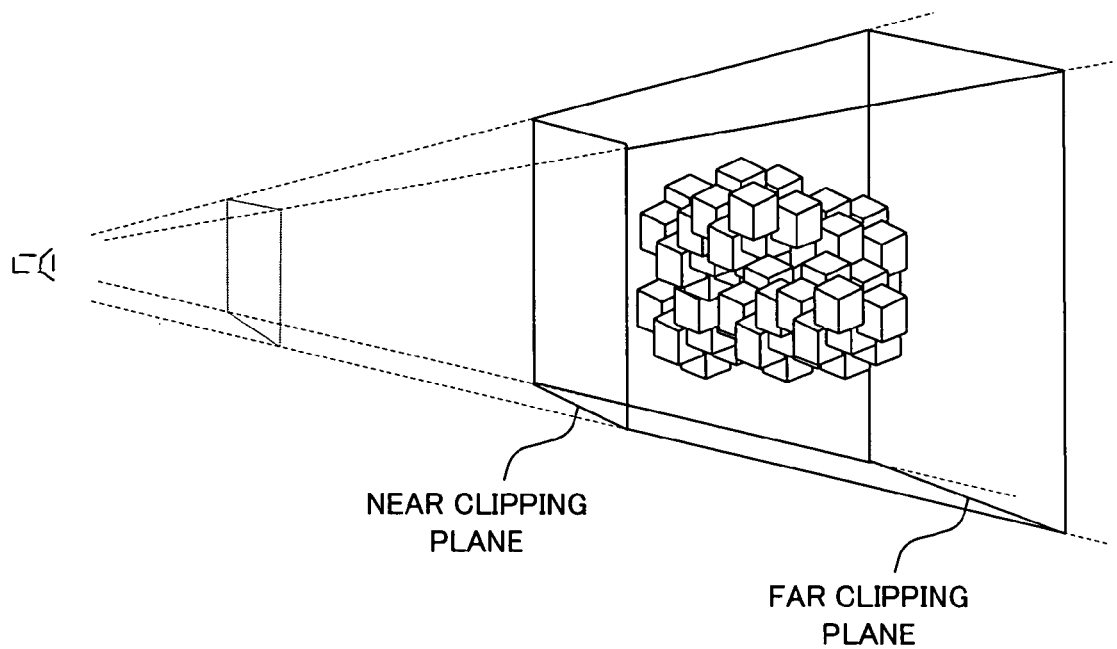
FIG. 8 is an illustration showing settings of a virtual camera when a back view volume is rendered.
Figure 9:
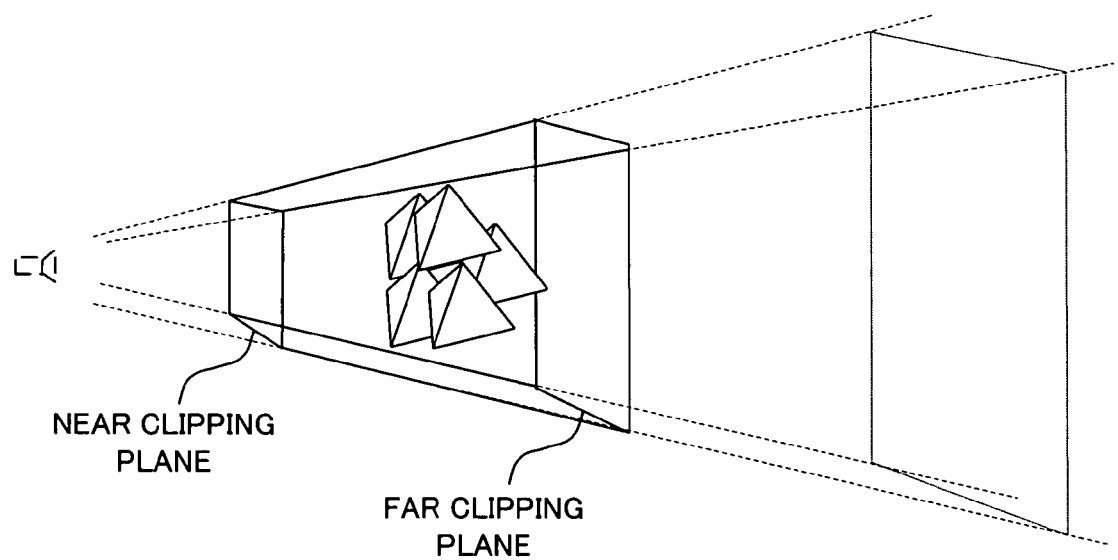
FIG. 9 is an illustration showing settings of the virtual camera when a front view volume is rendered.

In the present embodiment, as shown in FIG. 7, in the virtual three-dimensional game space, when an entire area to be displayed as a game image is assumed to be an entire view volume, this entire view volume is divided into two view volumes, that is, a front view volume closer to the virtual camera and a back view volume away from the virtual camera, wherein the back view volume is rendered in the first frame while the front view volume is rendered in the second frame. FIG. 8 shows a setting of the virtual camera in the first frame, and FIG. 9 shows a setting of the virtual camera in the second frame. Between the first and second frames, the position of the virtual camera, a viewing direction, and an angle of view are the same, but settings of a near clipping plane and a far clipping plane are different. That is, as shown in FIG. 8, in the first frame, a second clipping plane in FIG. 7 is set as a near clipping plane, while a third clipping plane in FIG. 7 is set as a far clipping plane. Also, as shown in FIG. 9, in the second frame, a first clipping plane in FIG. 7 is set as a near clipping plane, while the second clipping plane in FIG. 7 is set as a far clipping plane.

Figure 10:
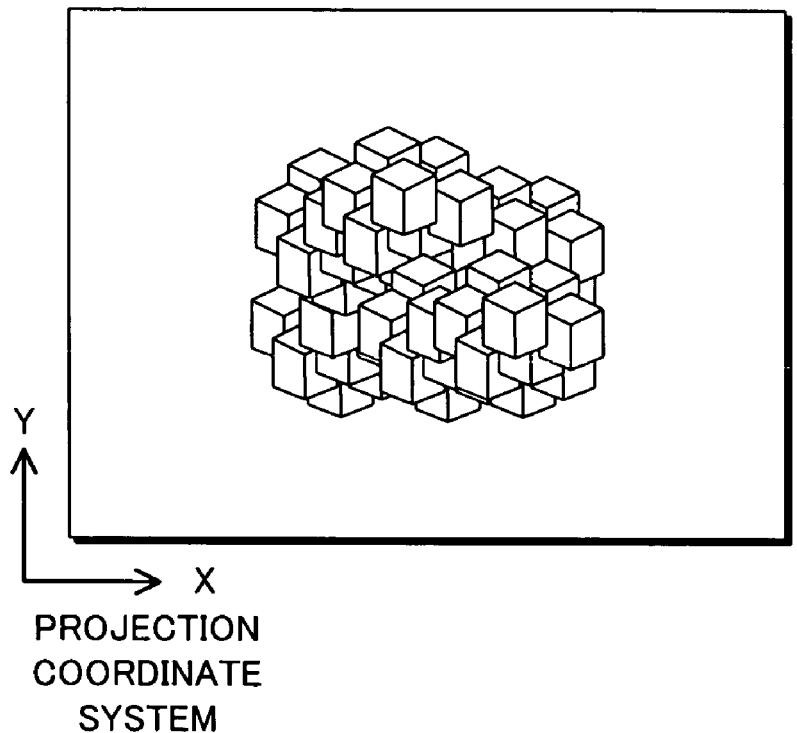
FIG. 10 is an illustration showing results of a geometry process on the back view volume.
Figure 11:
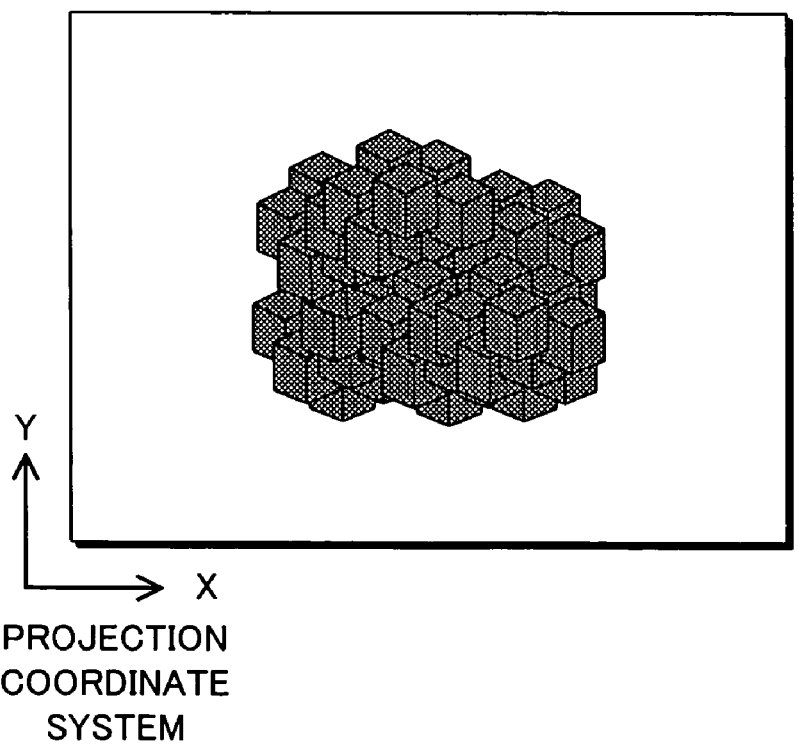
FIG. 11 is an illustration showing results of a rendering process on the back view volume.

FIG. 10 is an illustration showing results of a geometry process performed in the first frame by the three-dimensional image processing unit 31. Here, the coordinates of the vertices of the polygons included in the back view volume are converted from a world coordinate system to a projection coordinate system. Based on the results of such a geometry process, a rendering process is performed. FIG. 11 shows results of the rendering process performed by the three-dimensional image processing unit 31 in the first frame. In this manner, a game image representing the back view volume is generated.

Figure 12:
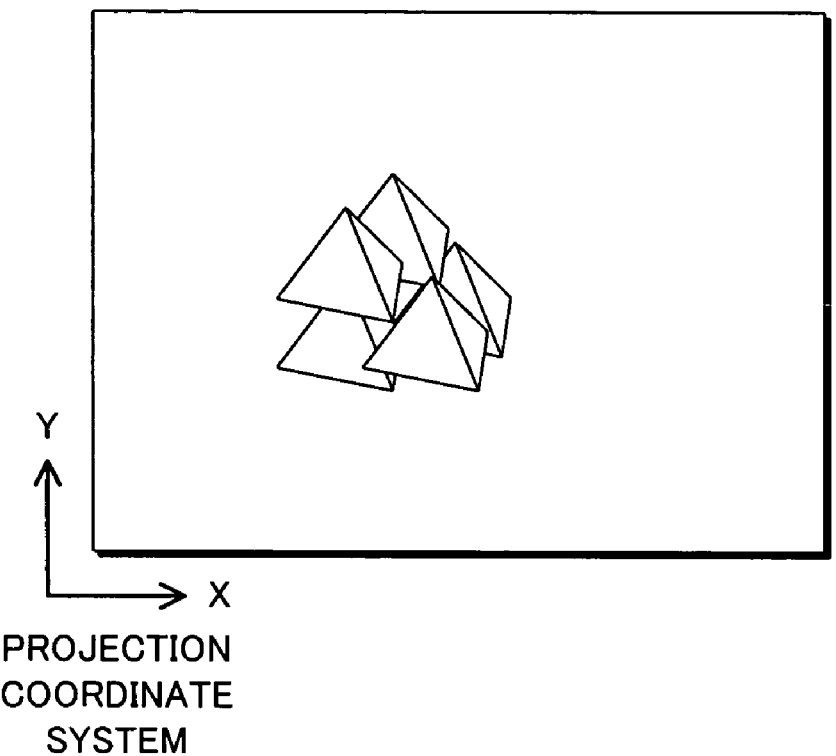
FIG. 12 is an illustration showing results of a geometry process on the front view volume.
Figure 13:
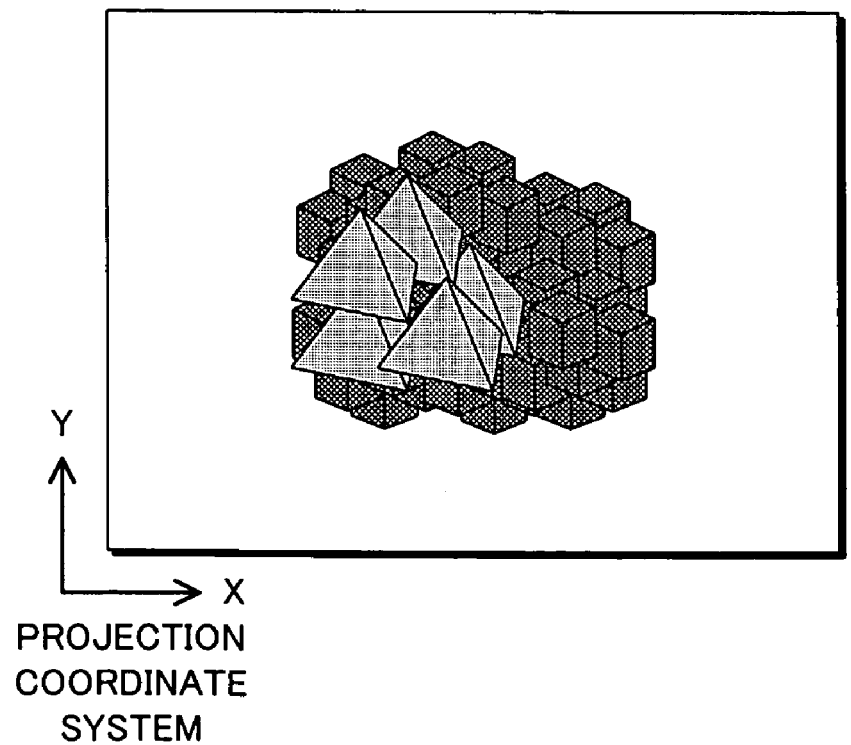
FIG. 13 is an illustration showing results of a rendering process on the front view volume.

FIG. 12 is an illustration showing results of a geometry process performed in the second frame by the three-dimensional image processing unit 31. Here, the coordinates of the vertices of the polygons included in the front view volume are converted from a world coordinate system to a projection coordinate system. Based on the results of such a geometry process, a rendering process is performed. In the second frame, the front view volume is rendered by using the game image generated in the first frame (FIG. 11), thereby generating a game image representing the entire view volume. FIG. 13 shows results of the rendering process performed by the three-dimensional image processing unit 31 in the second frame.

Figure 14:
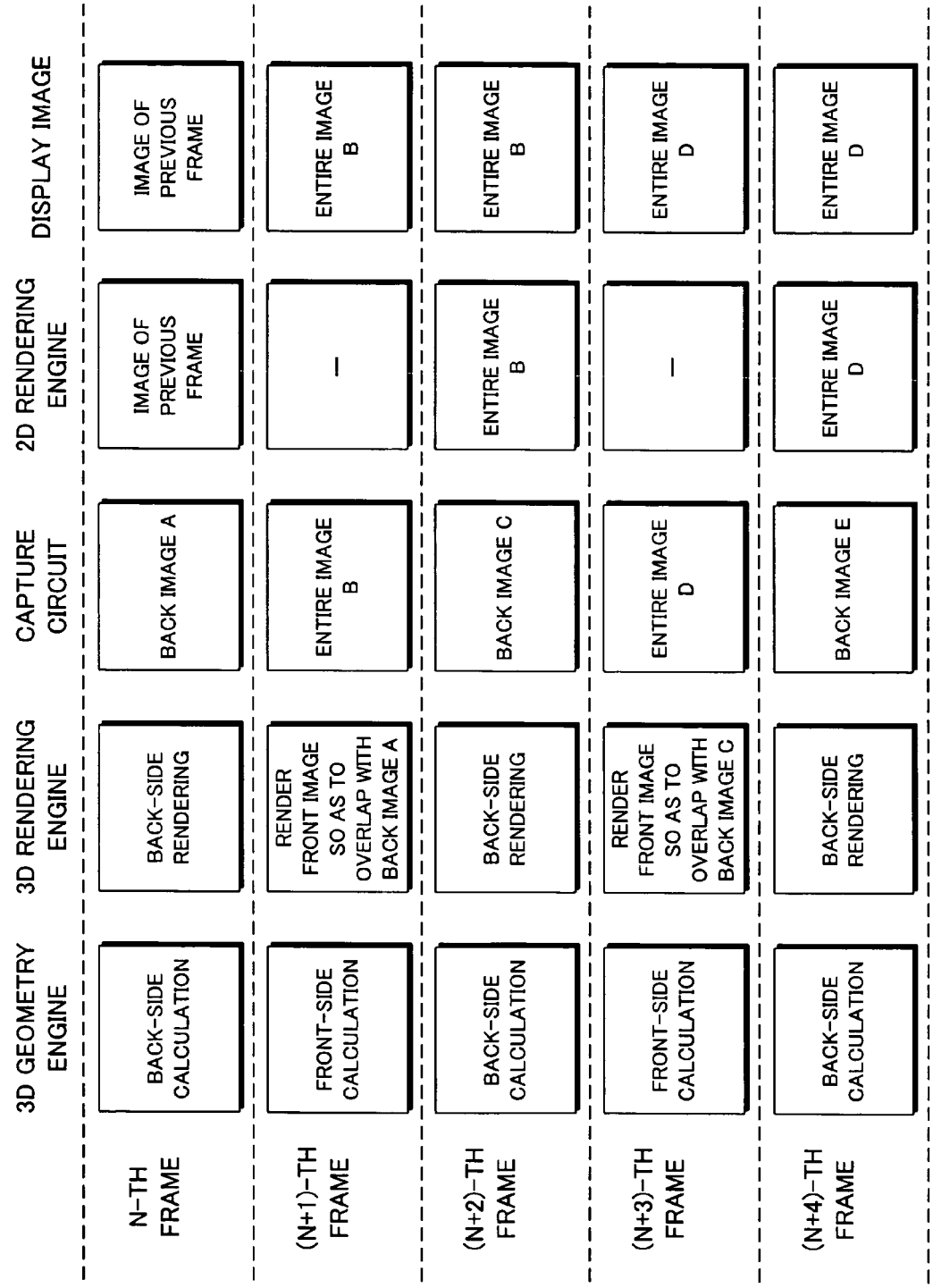
FIG. 14 is an illustration showing a flow of an image process.

With reference to FIG. 14, a flow of an image process according to the present embodiment is described below.

In an N-th frame, the geometry engine of the three-dimensional image processing unit 31 performs a coordinate calculation regarding polygons in the back view volume, while the rendering engine of the three-dimensional image processing unit 31 renders polygons in the back view volume, thereby generating a back image A. The capture circuit 33 captures the back image from the 3D line buffer, and then stores the captured image in the first VRAM 27a. Concurrently with these processes, the 2D rendering engine of the two-dimensional image processing unit 37 reads the entire image (image of the entire view volume) generated in the previous frame (that is, an (N−1)-th frame) by the three-dimensional image processing unit 31 and then stored by the capture circuit 33 in the second VRAM 27b, and then outputs the read data to the 2D line buffer 38. The entire image stored in the 2D line buffer 38 is output to the first LCD 11. As a result, on the first display screen 11a, the entire image generated in the (N−1)-th frame is displayed.

In an (N+1)-th frame, the geometry engine of the three-dimensional image processing unit 31 performs a coordinate calculation with respect to polygons in the front view volume, while the rendering engine of the three-dimensional image processing unit 31 renders polygons in the front view volume so that the polygons overlap the back image A stored in the first VRAM 27, thereby generating an entire image B. The capture circuit 33 captures the entire image B from the 3D line buffer, and then stores the captured image in the second VRAM 27b. The entire image stored in the 3D line buffer 32 is output to the first LCD 11. As a result, on the first display screen 11a, the entire image B generated in the (N+1)-th frame is displayed.

In an (N+2)-th frame, the geometry engine of the three-dimensional image processing unit 31 performs a coordinate calculation with respect to polygons in the back view volume, while the rendering engine of the three-dimensional image processing unit 31 renders polygons in the back view volume, thereby generating a back image C. The capture circuit 33 captures the back image C from the 3D line buffer, and the stores the captured image in the first VRAM 27a. Concurrently with these processes, the 2D rendering engine of the two-dimensional image processing unit 37 reads the entire image B generated in the previous frame (that is, an (N+1)-th frame) by the three-dimensional image processing unit 31 and then stored by the capture circuit 33 in the second VRAM 27b, and then outputs the read data to the 2D line buffer 38.

The entire image B stored in the 2D line buffer 38 is output to the first LCD 11. As a result, on the first display screen 11a, the entire image generated in the (N+1)-th frame is displayed.

In an (N+1)-th frame and thereafter, a process similar to the above is repeated. In this way, in the present embodiment, the same entire image is displayed twice on the display screen 11a.

Here, when 5000 polygons are present in the back view volume and 5000 polygons are present in the front view volume, these 10000 polygons in total cannot be displayed for each frame by a three-dimensional image processing unit 31 capable of rendering a maximum of 5000 polygons per frame (only a portion of the polygons are displayed or a game image is displayed on only part of the screen). In the present embodiment, 5000 polygons in the back view volume are rendered in the first frame, 5000 polygons in the front view volume are rendered in the second frame, and then an image of the back view volume and an image of the front view volume are combined together to form an entire image for display twice in a row. This allows 10000 polygons in total to be displayed per frame by the three-dimensional image processing unit 31 capable of rendering a maximum of 5000 polygons per frame.

Figure 15:
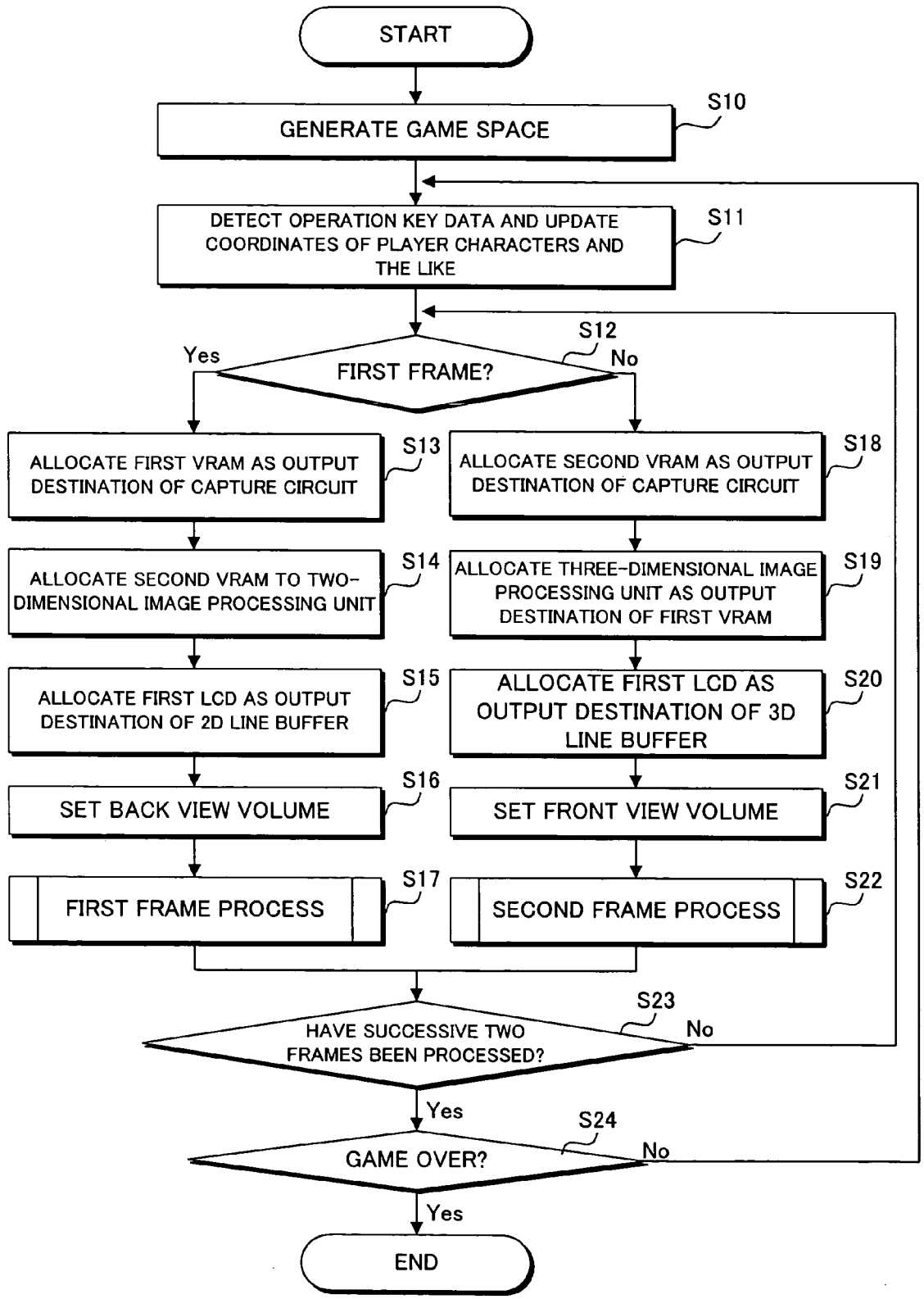
FIG. 15 is a flow chart showing a flow of the image process.
Figure 16:
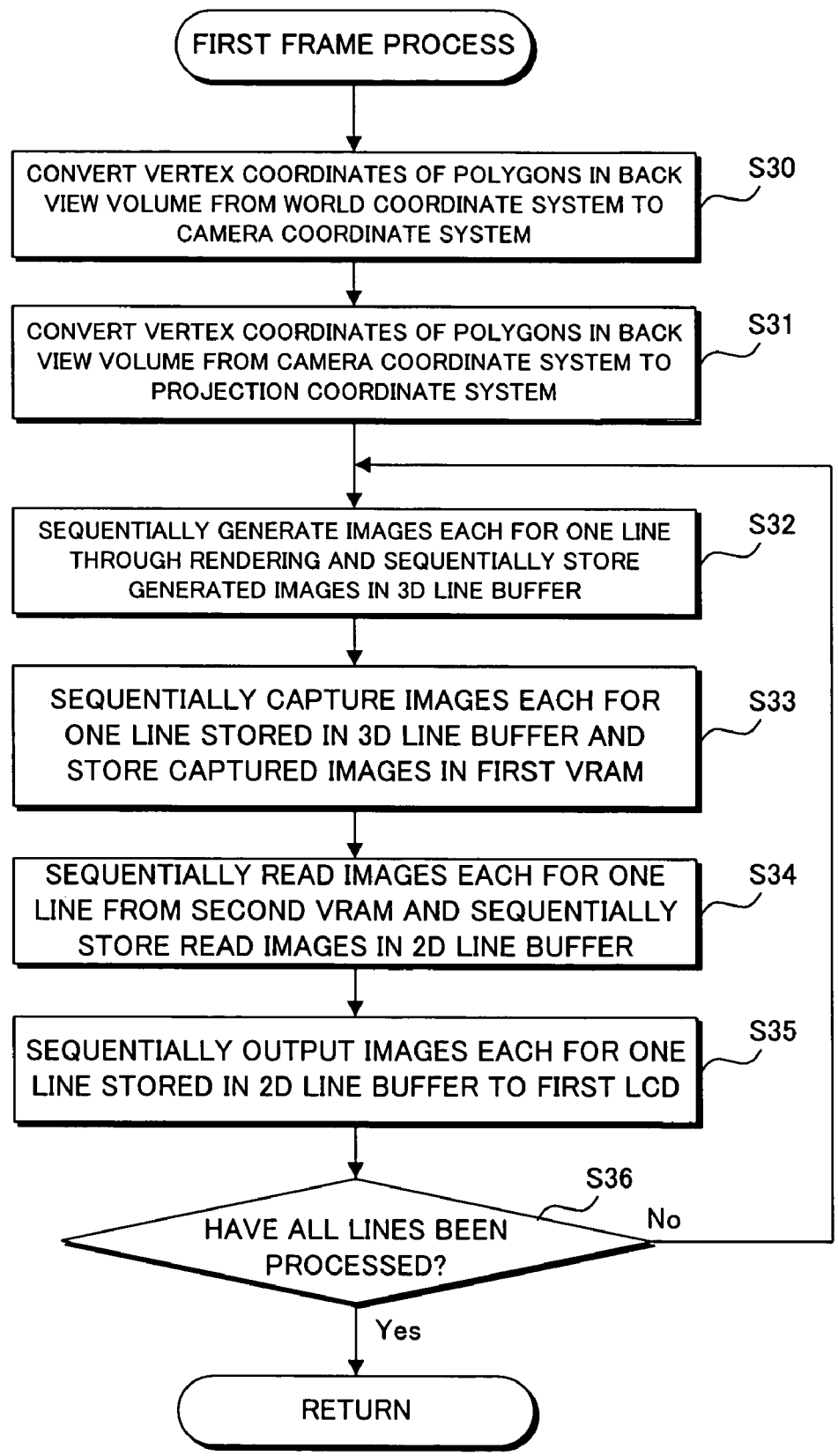
FIG. 16 is a flowchart showing a flow of a first frame process.
Figure 17:
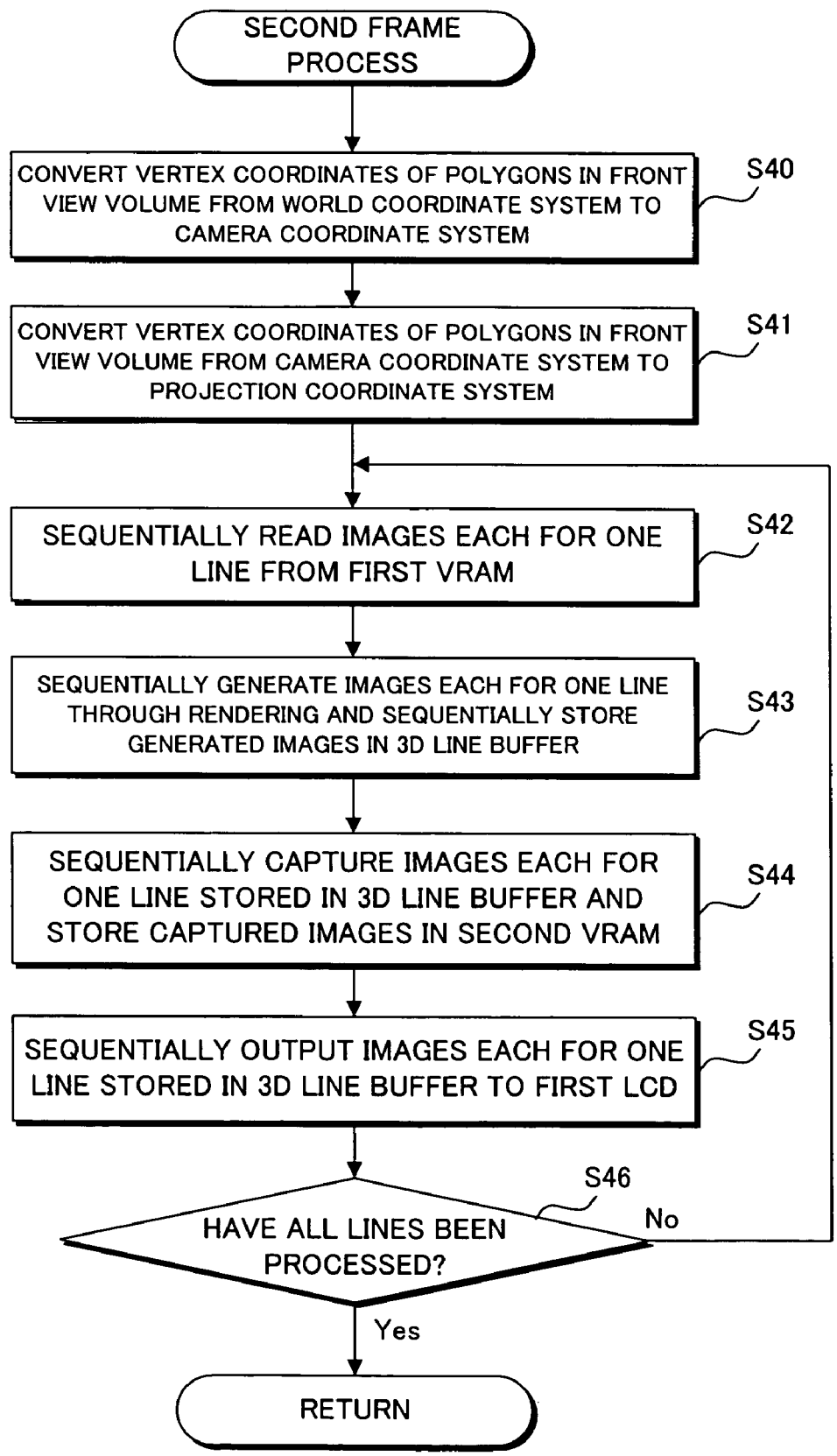
FIG. 17 is a flowchart showing a flow of a second frame process.

With reference to flowcharts of FIGS. 15 through 17, the operation of the portable game machine 1 is described in more detail. Here, steps S10 to S16 and S18 to S24 in FIG. 15a redescribed as process steps to be performed by the CPU 21, based on the game program stored in the program ROM 17a of the cartridge 17. However, any of these process steps maybe achieved by only using hardware.

In FIG. 15, the CPU 21 generates a virtual three-dimensional game space (S10). Specifically, world coordinates of each vertex of three-dimensional models, such as a player character and enemy characters, formed by a plurality of polygons, are set at initial values. Next, based on operation key data output from the operation keys 14, the CPU 21 updates the coordinates of the three-dimensional models, such as the player character, in the virtual three-dimensional game space (S11).

The CPU 21 then determines whether the current frame is a first frame (S12).

When the current frame is a first frame, the CPU 21 allocates the first VRAM 27a as the output destination of the capture circuit 33 (S13) and the second VRAM 27b to the two-dimensional image processing unit 37 (S14). Furthermore, the CPU 21 allocates the output of the 2D line buffer 38 to the first LCD 11 (S15) to set a back view volume (for example, to set a near clipping plane and a far clipping plane) (S16). Thereafter, a first frame process (S17) is performed, and then the procedure goes to step S23. Details of the first frame process are described further below.

On the other hand, when the current frame is a second frame, the CPU 21 allocates the three-dimensional image processing unit 31 as the output destination of the capture circuit 33 (S19). Furthermore, the CPU 21 allocates the first LCD 11 as the output destination of the 3D line buffer 32 (S20) to set a front view volume (for example, to set a near clipping plane and a far clipping plane) (S21). Thereafter, a second frame process (S22) is performed, and then the procedure goes to step S23. Details of the second frame process are described further below.

In step S23, the CPU 21 determines whether two successive frames (that is, the first frame and the second frame subsequent thereto) have been completely processed. If they have not been completely processed, the procedure returns to step S12 until the second frame process has been completed. If they have been completely processed, the procedure goes to step S24.

In step S24, the CPU 21 determines whether the game is over. If the game continues, the procedure returns to step S11 for updating the coordinates of the three-dimensional models. If the game is over, the procedure ends. In this way, the coordinates of the three-dimensional models are updated at the time of starting the first frame. That is, the coordinates of the three-dimensional models are updated once for every two frames.

Next, the details of the first frame process are described with reference to FIG. 16. This first frame process is performed by the GPU 23 based on instructions from the CPU 21.

First, the geometry engine of the three-dimensional image processing unit 31 converts vertex coordinates (in the world coordinate system) of each polygon in the back view volume to the camera coordinate system based on the virtual camera (S30). Furthermore, the geometry engine of the three-dimensional image processing unit 31 converts these vertex coordinates (in the camera coordinate system) to the two-dimensional projection coordinate system (S31). Hereinafter, the three-dimensional image processing unit 31 and the two-dimensional image processing unit 37 concurrently perform their respective processes.

Based on the conversion results of the vertex coordinates of each polygon in the back view volume, the rendering engine of the three-dimensional image processing unit 31 generates image data for one line through a rendering process, with reference to depth information (Z buffer values) of the polygons included in the first one line, and then stores the generated image data in the 3D line buffer 32 (S32). Then the image data for one line stored in this 3D line buffer 32 is stored in a predetermined area of the first VRAM 27a by the capture circuit 33 (S33). On the other hand, the 2D rendering engine of the two-dimensional image processing unit 37 reads the image data for the first one line of the game image stored in the second VRAM 27b, and then stores the read image data in the 2D line buffer 38 (S34). Then, the image data for one line stored in this 2D line buffer 38 is supplied to the first LCD 11 (S35). Then, after waiting for an H blank timing (horizontal blanking period) in order to establish horizontal synchronization, the procedure returns to step S32 for processing the next line in a manner similar to the above. That is, the rendering engine of the three-dimensional image processing unit 31 generates image data for the next one line through a rendering process and stores the generated image data in the 3D line buffer 32 (S32). Thereafter, until all lines have been completely processed (that is, until the entire screen has been completely processed), processes of steps S32 through S35 are repeated.

When all lines have been completely processed (Yes in S36), the first frame process ends.

Next, the details of the second frame process are described with reference to FIG. 17. This second frame process is performed by the GPU 23 based on instructions from the CPU 21.

First, the geometry engine of the three-dimensional image processing unit 31 converts vertex coordinates (in the world coordinate system) of each polygon in the front view volume to the camera coordinate system based on the virtual camera (S40). Then, the geometry engine of the three-dimensional image processing unit 31 further converts these vertex coordinates (in the camera coordinate system) to the two-dimensional projection coordinate system (S41).

The rendering engine of the three-dimensional image processing unit 31 reads the image data for the first one line from the first VRAM 27. Based on the conversion results of the vertex coordinates of each polygon in the front view volume, image data for one line is generated through a rendering process with reference to the depth information of the polygons included in the first one line in the front view volume so as to overwrite the image data for one line read in step S42, and then is stored in the 3D line buffer 32 (S43). The image data for one line stored in the 3D line buffer 32 is stored by the capture circuit 33 in a predetermined area of the second VRAM 27b (S44). Also, the image data for one line stored in this 3D line buffer 32 is also supplied to the first LCD 11 (S45). Then, after waiting for an H blank timing (horizontal blanking period) in order to establish horizontal synchronization, the procedure returns to step S42 for processing the next line in a manner similar to the process described above. That is, the rendering engine of the three-dimensional image processing unit 31 reads image data for the next one line from the first VRAM 27a (S42). Thereafter, until all lines have been completely processed (that is, until the entire screen has been completely processed), processes of steps S42 through S45 are repeated.

When all lines have been completely processed (Yes in S46), the first frame process ends.

As such, according to the portable game machine 1 of the illustrative embodiments, many polygons, beyond the capability of the three-dimensional image processing unit, can be displayed without causing inconveniences in image display (such that only a portion of the polygons are rendered or that the game image is displayed in only a partial area on the screen).

As is evident from the above description, in the present embodiment, the two-dimensional image processing unit 37 merely transfers the game image stored in the second VRAM 27b to the 2D line buffer 38. Therefore, if a transferring function is separately provided, the two-dimensional image processing unit 37 is not required.

Also, in the above description, where to set a boundary between the back view volume and the front view volume (that is, the second clipping plane in FIG. 7), in the entire view volume, has not been particularly discussed. The position of the second clipping plane may be fixed, or may be changed as appropriate, according to the situation (for example, according to the disposition pattern of the polygons disposed in the entire view volume). For example, the number of polygons included in the entire view volume is first calculated, and then the position of the second clipping plane is adjusted so that the front view volume and the back view volume each include a half of the polygons included in the entire view volume.

Figure 18:
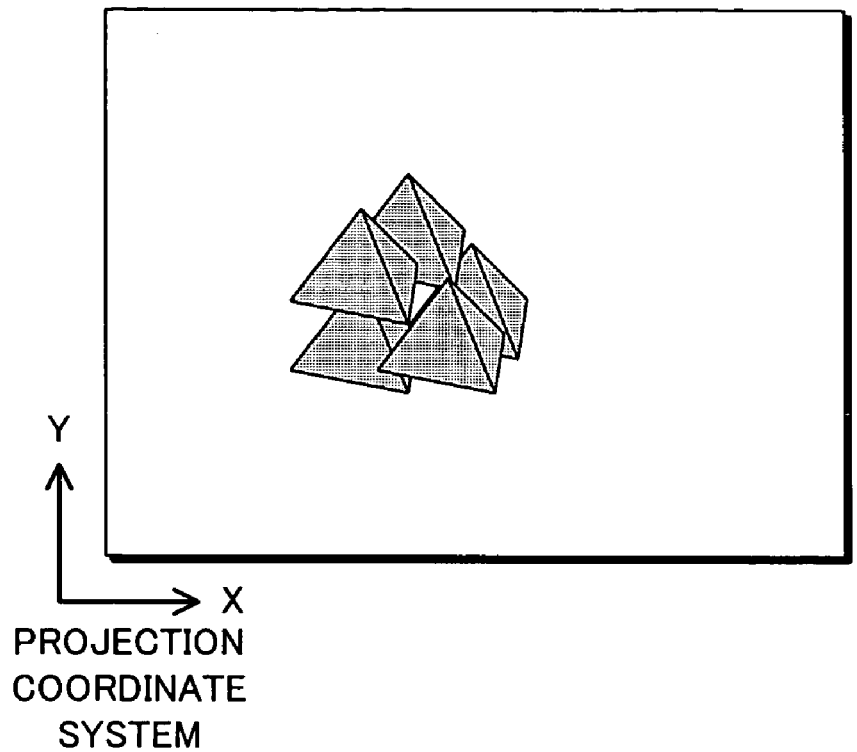
FIG. 18 is an illustration showing an example of a front image.
Figure 19:
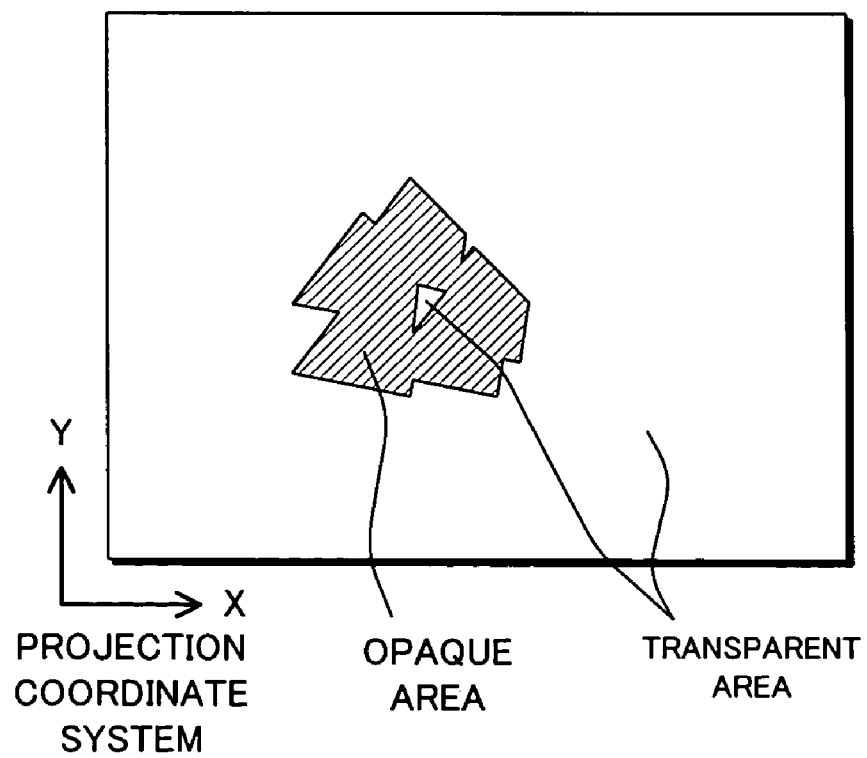
FIG. 19 is an illustration showing alpha values of pixels in the front image.

Furthermore, in the present embodiment, the back view volume is rendered in the first frame for generating a back image, and in the second frame, the front view volume is rendered with the back image as a background, thereby generating the entire image. However, the present invention is not restricted to the above. The front view volume may be rendered in the first frame, and the back view volume may be rendered in the second frame. In this case, when the front view volume is rendered in the first frame for generating a front image, an alpha value is set for each pixel and is included in the front image. Then, when the back view volume is rendered in the second frame, for generating the entire image, the entire image is generated with reference to the alpha values of the front image. More specifically, for example, in a front image as shown in FIG. 18, the alpha value of each pixel is set so that an area where polygons are rendered is not transparent, and the other area is transparent, as shown in FIG. 19. Base on the alpha values shown in FIG. 19, the front image of FIG. 18 and the back image of FIG. 11 are combined together, thereby generating an entire image as shown in FIG. 13.

Figure 20:
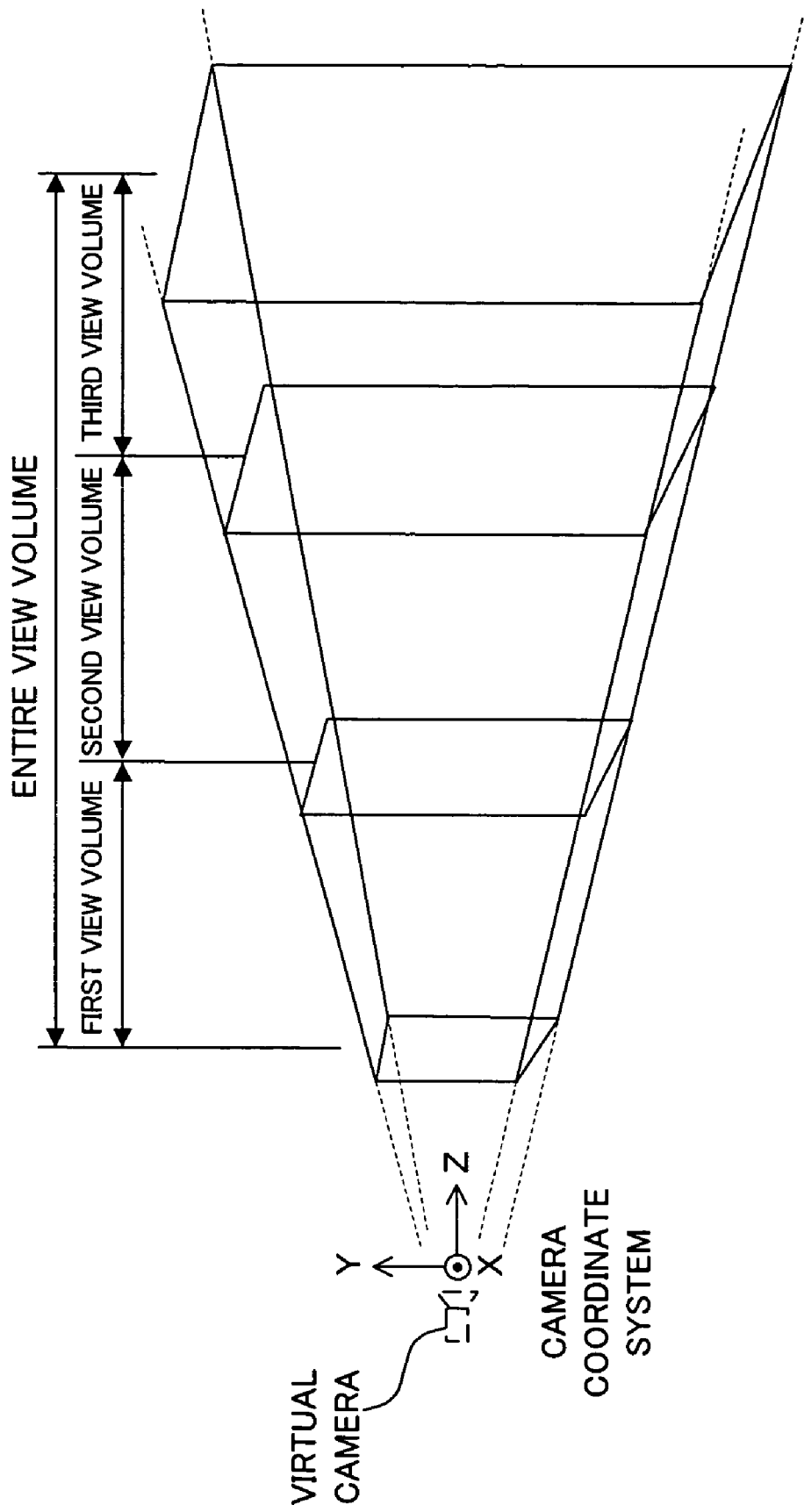
FIG. 20 is an illustration showing an example of divided view volume.

Still further, in the present embodiment, the entire view volume is divided into two view volumes, that is, the back view volume and the front view volume. When more polygons are desired to be displayed, the entire view volume may be divided into three view volumes, that is, a first view volume, a second view volume, and a third view volume, as shown in FIG. 20. In this case, a first view volume image, a second view volume image, and a third view volume image are sequentially generated in successive three frames, and these images are combined together through alpha blending to generate the entire image. Alternatively, the entire image may be generated in the following manner. In successive three frames, a third view volume image is generated in the first frame, and a partial view volume image is generated in the next frame by rendering polygons in the second view volume with the third view volume image being taken as the background, and then an entire image is generated in the last frame by rendering polygons in the first view volume with the partial view volume image being taken as the background.

Still further, in the present embodiment, the entire view volume is divided into two view volumes aligned along a direction of a line of sight of a view point (virtual camera) set in the game space. This is not meant to restrict the present invention. The entire view volume may be arbitrarily divided. For example, as shown in FIG. 21, the entire view volume may be divided into an area having positive Y coordinates in the virtual camera coordinate system (upper view volume) and an area having negative Y coordinates therein (lower view volume).

As one embodiment of the present invention, the portable game machine having a hardware structure as shown in FIGS. 2 and 3 has been described. However, the present invention is applied not only to the portable game machine having such a hardware structure, but to the one having the above hardware structure achieved by the CPU and software. Also, the portable game machine according to the present embodiment can be emulated by a computer system, such as a personal computer or a portable information terminal. In this case, a game program that causes the computer system to achieve each hardware function of the portable game machine according to the present embodiment is supplied to the computer system. With this, the present invention can also be applied to a general-purpose computer system.

While the invention has been described in detail, the foregoing description is in all aspects illustrative and not restrictive. It is understood that numerous other modifications and variations can be devised without departing from the scope of the invention.

What is claimed is:

1. A computer-readable storage medium having stored therein a program for displaying a plurality of polygons distributed throughout a game space, which is a three-dimensional virtual space, based on a view point set in the game space, the program causing a computer to perform steps comprising:

(a) in an N-th frame where one frame is taken as a display updating period of a display,
a step of outputting an entire view volume image stored in an (N−1)-th frame in display-purpose storage locations to the display;
a step of rendering polygons included in a first view volume, which is one of two view volumes obtained by dividing an entire view volume, which is an area in the game space to be displayed, into two parts, to generate a first view volume image; and
a step of storing the first view volume image in non-display-purpose storage locations, and (b) in an (N+1)-th frame,
- a step of rendering polygons included in a second view volume, which is another one of the two view volumes obtained by dividing the entire view volume into two parts, to generate a second view volume image, and combining together the second view volume image and the first view volume image, stored in the non-display-purpose storage locations, to generate an entire view volume image;
- a step of outputting the generated entire view volume to the display; and
- a step of storing the generated entire view volume image in the display-purpose storage locations.

2. The computer-readable storage medium according to claim 1, wherein
the first view volume and the second view volume are aligned along a direction of a line of sight from the view point set in the game space so that the first view volume is at a back position and the second view volume is at a front position when viewed from the view point, and
in the entire view volume image generating step, the polygons in the second view volume are rendered with the first view volume image stored in non-display-purpose storage locations as a background, thereby generating the entire view volume image with the second view volume image and the first view volume image being combined together.

3. The computer-readable storage medium according to claim 1, wherein
the first view volume and the second view volume are aligned along a direction of a line of sight from the view point set in the game space, and
in the entire view volume image generating step, by using an alpha value of each pixel of at least one of the first view volume image and the second view volume image that is at a front position viewed from the view point, the first view volume image and the second view volume image are combined through alpha blending to generate the entire view volume image.

4. The computer-readable storage medium according to claim 1, wherein
the program further causes the computer to function as view volume setting mechanism which appropriately changes a size of the first view volume and a size of the second view volume according to a distribution pattern of polygons distributed throughout the entire view volume.

5. A computer-readable storage medium having stored therein a program for displaying a plurality of polygons disposed on a game space, which is a three-dimensional virtual space, based on a view point set in the game space, the program causing a computer to perform steps comprising:
(a) in an N-th frame where one frame is taken as a display updating period of a display,
- a step of outputting an entire view volume image stored in an (N−1)-th frame in display-purpose storage locations for display;
- a step of rendering polygons included in a first view volume, which is one of three view volumes obtained by dividing an entire view volume, which is an area in the game space to be displayed, into three parts, to generate a first view volume image; and
- a step of storing the first view volume image in non-display-purpose storage locations, (b) in an (N+1)-th frame,
- a step of outputting the entire view volume image stored in the (N−1)-th frame in the display-purpose storage locations for output;
- a step of rendering polygons included in a second view volume, which is another one of the three view volumes obtained by dividing the entire view volume into three parts, to generate a second view volume image, and combining together the second view volume image and the first view volume image, stored in the non-display-purpose storage locations, to generate a partial view volume image; and
- a step of storing the partial view volume image in the non-display-purpose storage locations, (c) in an (N+2)-th frame,
a step of rendering polygons included in a third view volume, which is still another one of the three view volumes obtained by dividing the entire view volume into three parts, to generate a third view volume image, and combining the partial view volume image stored in the non-display-purpose storage locations and the third view volume image together to generate an entire view volume image;
- a step of outputting the entire view volume image to the display; and
- a step of storing the entire view volume image in the display-purpose storage locations.

6. A portable game machine comprising:
a display unit;
a three-dimensional image processing unit for generating a game image based on three-dimensional model data;
a first line buffer for temporarily retaining, for each line, the game image generated by the three-dimensional image processing unit and then sequentially outputting the game image to the display unit;
a capture circuit for capturing the image data by sequentially capturing data stored in the first line buffer;
a storage unit for temporarily storing the game image captured by the capture circuit; and
a second line buffer for temporarily retaining, for each line, the game image stored in the storage unit and then sequentially outputting the game image to the display unit, wherein
(a) in an N-th frame where one frame is taken as a display updating period of a display,
the second line buffer outputs an entire view volume image stored in an (N−1)-th frame in the storage unit to the display unit,
the three-dimensional image processing unit renders polygons included in a first view volume, which is one of two areas obtained by dividing the entire view volume, which is an area in the game space to be displayed, into two parts, to generate a first view volume image, and sequentially outputs the generated first view volume image to the first line buffer, and
the capture circuit captures the first view volume image by sequentially capturing data stored in the first line buffer, and stores the captured first view volume image in the storage unit, and
(b) in an (N+1)-th frame,
the three-dimensional image processing unit renders polygons included in a second view volume, which is another one of the two areas obtained by dividing the entire view volume into two parts to generate a second view volume image, combines together the second view volume image and the first view volume image, stored in the storage unit, to generate an entire view volume image, and then sequentially outputs the generated entire view volume image to the first line buffer, the first line buffer temporarily retains the entire view volume image generated by the three-dimensional image processing unit, and then outputs the entire view volume image to the display unit, and the capture circuit captures the entire view volume image by sequentially capturing data stored in the first line buffer, and stores the captured entire view volume image in the storage unit.

7. A portable game machine comprising:

a display unit;

a three-dimensional image processing unit for generating a game image based on three-dimensional model data;

a first line buffer for temporarily retaining, for each line, the game image generated by the three-dimensional image processing unit and then sequentially outputting the game image to the display unit;

a capture circuit for capturing the image data by sequentially capturing data stored in the first line buffer;

a storage unit for temporarily storing the game image captured by the capture circuit; and a second line buffer for temporarily retaining, for each line, the game image stored in the storage unit and then sequentially outputting the game image to the display unit, wherein (a) in an N-th frame where one frame is taken as a display updating period of a display, the second line buffer outputs an entire view volume image stored in an (N−1)-th frame in the storage unit to the display unit, the three-dimensional image processing unit renders polygons included in a first view volume, which is one of three areas obtained by dividing the entire view volume, which is an area in the game space to be displayed, into three parts, to generate a first view volume image, and sequentially outputs the generated first view volume image to the first line buffer, and the capture circuit captures the first view volume image by sequentially capturing data stored in the first line buffer, and stores the captured first view volume image in the storage unit, (b) in an (N+1)-th frame, the second line buffer outputs the entire view volume image stored in the (N−1)-th frame in the storage unit to the display unit, the three-dimensional image processing unit renders polygons included in a second view volume, which is another one of the three areas obtained by dividing the entire view volume into three parts, to generate a second view volume image, combines the first view volume image stored in the storage unit and the second view volume image together to generate a partial view volume image, and then sequentially outputs the generated partial view volume image to the first line buffer, and the capture circuit captures the partial view volume image by sequentially capturing data stored in the first line buffer, and (c) in an (N+2)-th frame, the three-dimensional image processing unit renders polygons included in a third view volume, which is still another one of the three areas obtained by dividing the entire view volume into three to generate a third view volume image, combines the partial view volume image stored in the storage unit and the third view volume image together to generate an entire view volume image, and then sequentially outputs the generated partial view volume image to the first line buffer, the first line buffer temporarily retains the entire view volume image generated by the three-dimensional image processing unit and then sequentially outputs the entire view volume image to the display unit, and the capture circuit captures the entire view volume image by sequentially capturing data stored in the first line buffer.

* * * * *